US012810819B2

(12) United States Patent
Yamamoto

(10) Patent No.: US 12,810,819 B2
(45) Date of Patent: Nov. 24, 2026

(54) DRIVE CIRCUIT, DISPLAY DEVICE, AND ELECTROPHORETIC DISPLAY DEVICE

(71) Applicant: Sharp Display Technology Corporation, Kameyama City (JP)

(72) Inventor: Kaoru Yamamoto, Kameyama City (JP)

(73) Assignee: SHARP DISPLAY TECHNOLOGY CORPORATION, Kameyama City (JP)

( * ) Notice: Subject to any disclaimer, the term of this patent is extended or adjusted under 35 U.S.C. 154(b) by 0 days.

(21) Appl. No.: 19/173,946

(22) Filed: Apr. 9, 2025

(65) Prior Publication Data

US 2025/0336375 A1 Oct. 30, 2025

(30) Foreign Application Priority Data

Apr. 25, 2024 (JP) ................................ 2024-071865

(51) Int. Cl.
*G09G 3/34* (2006.01)

(52) U.S. Cl.
CPC ... *G09G 3/3446* (2013.01); *G09G 2300/0426* (2013.01); *G09G 2310/0267* (2013.01); *G09G 2310/08* (2013.01); *G09G 2330/021* (2013.01)

(58) Field of Classification Search
CPC ........ G09G 3/34; G09G 3/344; G09G 3/3446; G09G 3/3677; G09G 2300/0426; G09G 2310/0267; G09G 2310/08; G09G 2330/021
See application file for complete search history.

(56) References Cited

U.S. PATENT DOCUMENTS

2005/0140621 A1* 6/2005 Kubota ................ G09G 3/3688 345/87
2007/0034961 A1* 2/2007 Kimura .................... G09G 3/20 257/365
2007/0188672 A1* 8/2007 Sato ..................... G09G 3/3677 349/56
2007/0194973 A1* 8/2007 Nakao .................. G11C 19/184 341/155
2008/0013670 A1* 1/2008 Lo .......................... G11C 19/28 377/79
2009/0027083 A1 1/2009 Kimura et al.
2013/0093743 A1* 4/2013 Takahashi ............ G11C 19/184 345/211
2016/0300623 A1* 10/2016 Yang ...................... G09G 5/003
2022/0406818 A1* 12/2022 Kawashima ........... G11C 19/28
2025/0054432 A1* 2/2025 Matsuzaki ........... G09G 3/2092

FOREIGN PATENT DOCUMENTS

JP 2008009418 A 1/2008
JP 2020135910 A 8/2020

* cited by examiner

*Primary Examiner* — Cory A Almeida
(74) *Attorney, Agent, or Firm* — Keating & Bennett, LLP

(57) ABSTRACT

A unit circuit of a gate drive circuit includes a transistor to which a clock signal is applied, a transistor including a gate electrode to which a set signal is input, a source electrode to which a VDD signal is applied, and a drain electrode connected to a node, and a transistor including a gate electrode to which a reset signal is input, a sour electrode to which a VSS signal is applied, and a drain electrode connected to the node. A difference value between a voltage value of the VDD signal and a voltage value of the VSS signal is smaller than an amplitude of the clock signal.

16 Claims, 23 Drawing Sheets

DRIVE CIRCUIT, DISPLAY DEVICE, AND ELECTROPHORETIC DISPLAY DEVICE

CROSS-REFERENCE TO RELATED APPLICATIONS

This application claims the benefit of priority to Japanese Patent Application Number 2024-071865 filed on Apr. 25, 2024. The entire contents of the above-identified application are hereby incorporated by reference.

BACKGROUND

Technical Field

The disclosure relates to a drive circuit, a display device, and an electrophoretic display device.

A shift register circuit described in JP 2020-135910 A constitutes a gate line drive circuit. The shift register circuit includes a plurality of unit shift register circuits. Each of the plurality of unit shift register circuits includes a first transistor to which a clock signal is input, a second transistor including a gate to which a set signal is input, and a third transistor to which a reset signal is input. A DC high-level voltage is applied to a drain of the second transistor. A DC low-level voltage is applied to the third transistor. When the set signal is input to the second transistor and the clock signal is input to the first transistor, the unit shift register circuit outputs an output signal having the same level as the clock signal. A difference value between the DC high-level voltage and the DC low-level voltage is equal to an amplitude of the clock signal.

SUMMARY

Here, a rate of transistor deterioration increases as the applied voltage increases. In the shift register circuit described in JP 2020-135910 A, when the level of an output signal (drive signal to be output) is increased, the transistor deterioration is accelerated.

Thus, the disclosure has been conceived to solve the problem described above, and an object of the disclosure is to provide a drive circuit, a display device, and an electrophoretic display device that can reduce the rate of transistor deterioration even in a case in which the drive signal level is increased.

In order to solve the problem described above, a drive circuit according to a first aspect is a drive circuit including a plurality of stages and configured to supply a drive signal to a group of scanning signal lines in response to input of a plurality of clock signals. The drive circuit includes a unit circuit constituting one stage of the plurality of stages and configured to output the drive signal to any one scanning signal line of the group of scanning signal lines. The unit circuit includes a first node, a first transistor configured to output the drive signal to a scanning signal line of the group of scanning signal lines, the first transistor including a gate electrode connected to the first node and a source electrode to which a first clock signal having a first voltage is applied, a second transistor to which a set signal for the unit circuit is input, the second transistor including a gate electrode to which the set signal is input, a source electrode to which a DC second voltage is applied, and a drain electrode connected to the first node, and a third transistor to which a reset signal for the unit circuit is input, the third transistor including a gate electrode to which the reset signal is input, a source electrode to which a DC third voltage is applied, and a drain electrode connected to the first node. A difference value between the second voltage and the third voltage is smaller than an amplitude of the first voltage.

A display device according to a second aspect includes the drive circuit according to the first aspect and a display arranged with the group of scanning signal lines.

An electrophoretic display device according to a third aspect includes the drive circuit according to the first aspect, a pixel transistor connected to one scanning signal line of the group of scanning signal lines, a pixel electrode connected to the pixel transistor, a counter electrode arranged to face the pixel electrode, and charged particles arranged between the pixel electrode and the counter electrode.

According to the configuration described above, even in a case in which the level of the drive signal is increased, the rate of transistor deterioration can be reduced.

BRIEF DESCRIPTION OF DRAWINGS

The disclosure will be described with reference to the accompanying drawings, wherein like numbers reference like elements.

DESCRIPTION OF EMBODIMENTS

Figure 1:
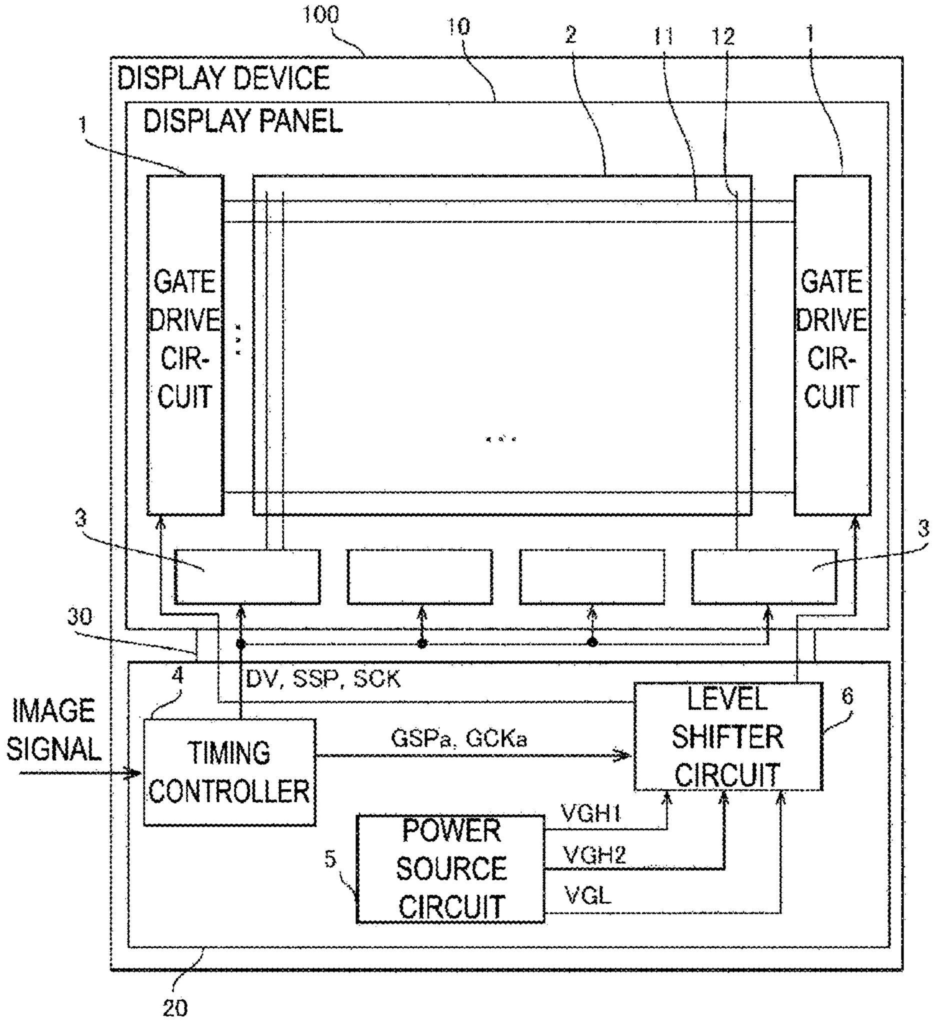
FIG. 1 is a block diagram illustrating a configuration of a display device 100 according to a first embodiment.

Embodiments of the disclosure will be described below with reference to the drawings. Note that the disclosure is not limited to the following embodiments, and appropriate design changes can be made within a scope that satisfies the configuration of the disclosure. In the description below, the same reference signs are used in common among the different drawings for portions having the same or similar functions, and repeated description thereof will be omitted. Further, the configurations described in the embodiments and the modified examples may be combined or modified as appropriate within a range that does not depart from the gist of the disclosure. For ease of explanation, in the drawings referenced below, the configuration is simplified or schematically illustrated, or a portion of the components is omitted.

First Embodiment

Overall Configuration of Display Device

Figure 2:
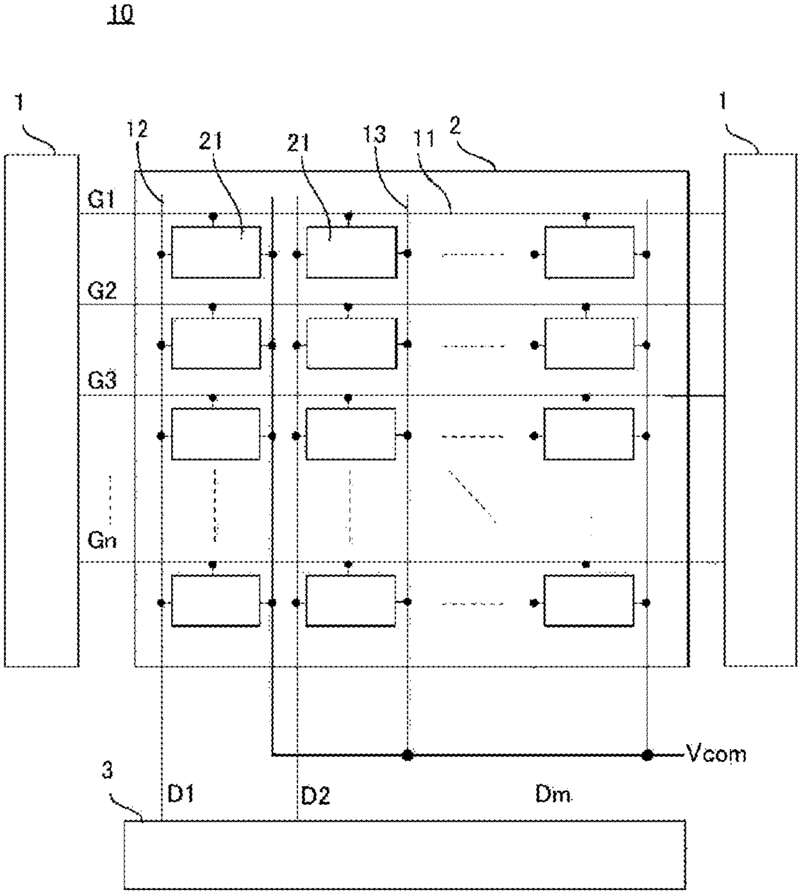
FIG. 2 is a block diagram illustrating a configuration inside a display panel 10.
Figure 3:
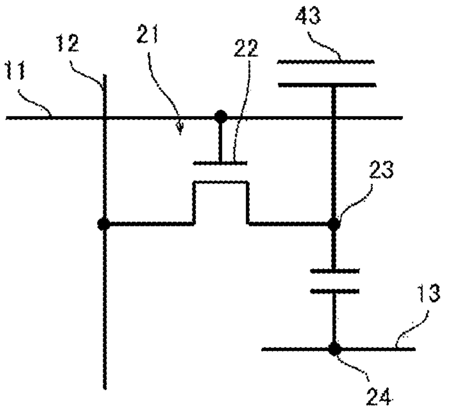
FIG. 3 is a circuit diagram illustrating a configuration of a pixel 21.
Figure 4:
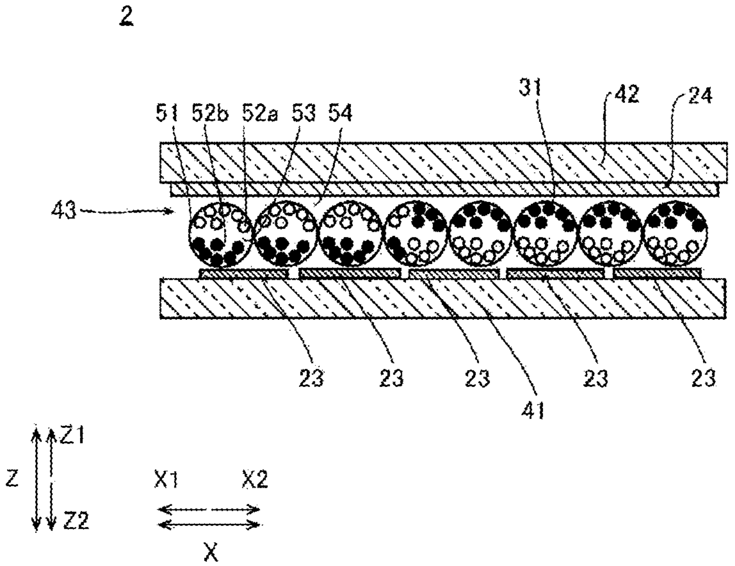
FIG. 4 is a cross-sectional view illustrating a configuration of a display portion 2.

FIG. 1 is a block diagram illustrating a configuration of a display device 100 according to a first embodiment. FIG. 2 is a block diagram illustrating a configuration inside a display panel 10. FIG. 3 is a circuit diagram illustrating a configuration of a pixel 21. FIG. 4 is a cross-sectional view illustrating a configuration of a display portion 2.

The display device 100 according to the first embodiment is configured as an electrophoretic display and a non-emitting display. In addition, the display device 100 is an electronic paper display. As illustrated in FIG. 1, the display device 100 includes the display panel 10, a control board 20, and a flexible printed circuit board 30. The display panel 10 includes two gate drive circuits 1, the display portion 2 that is a region in which an image is displayed, and a source drive circuit 3. The control board 20 is provided with a timing controller 4, a power source circuit 5, and a level shifter circuit 6. The flexible printed circuit board 30 connects the display panel 10 and the control board 20.

As illustrated in FIG. 1, the timing controller 4 receives timing signals (such as a horizontal synchronization signal, a vertical synchronization signal, and a data enable signal) and an image signal, and generates a digital image signal DV, a source start pulse signal SSP, a source clock signal SCK, a gate start pulse signal GSPa, and a gate clock signal GCKa based on the received signals. The timing controller 4 transmits the digital image signal DV, the source start pulse signal SSP, and the source clock signal SCK to each source drive circuit 3 via the flexible printed circuit board 30. The timing controller 4 also transmits the gate start pulse signal GSPa and the gate clock signal GCKa to the level shifter circuit 6.

The power source circuit 5 generates a first gate-on voltage VGH1, a second gate-on voltage VGH2, and a gate-off voltage VGL based on power input from an external power supply or a battery (not illustrated). The first gate-on voltage VGH1, the second gate-on voltage VGH2, and the gate-off voltage VGL are DC voltages having a constant level (voltage value). Here, in the first embodiment, there is a relationship of voltage values VGH1>VGH2>VGL. The power source circuit 5 inputs the generated first gate-on voltage VGH1, second gate-on voltage VGH2, and gate-off voltage VGL to the level shifter circuit 6.

The level shifter circuit 6 generates clock signals CKA and CKB each having a voltage value of a difference value between the first gate-on voltage VGH1 and the gate-off voltage VGL, a VDD signal having the second gate-on voltage VGH2, and a VSS signal having the gate-off voltage VGL. The level shifter circuit 6 inputs the generated signals to each of the two gate drive circuits 1 via the flexible printed circuit board 30. The clock signal CKB is a signal whose phase is shifted by 180 degrees relative to the clock signal CKA.

As illustrated in FIG. 2, the two gate drive circuits 1 include the gate drive circuit 1 arranged on one side of the display portion 2 and the gate drive circuit 1 arranged on the other side of the display portion 2. The gate drive circuit 1 arranged on one side of the display portion 2 and the gate drive circuit 1 arranged on the other side of the display portion 2 have the same configuration. Each of the two gate drive circuits 1 is a Gate Driver On Array (GOA) formed on an array substrate 41 (see FIG. 4) of the display panel 10.

In the display panel 10, a plurality of (for example, n) gate lines 11 constituting a group of scanning signal lines each connected to the gate drive circuit 1 and a plurality of (for example, m) source lines 12 constituting a group of source signal lines each connected to the source drive circuit 3 are arranged. Each of n and m is a natural number. The plurality of gate lines 11 and the plurality source lines 12 are arranged to intersect with each other, and the pixel 21 is arranged in each region defined by the plurality of gate lines 11 and the plurality of source lines 12. A plurality of pixels 21 are arranged in a matrix in the display panel 10. In the display panel 10, a plurality of common voltage lines 13, each of which supplies a common voltage Vcom to a counter electrode 24 (see FIG. 3) included in each of the plurality of pixels 21, are arranged.

As illustrated in FIG. 3, the pixel 21 is provided with a pixel transistor 22 and a pixel electrode 23. A gate electrode of the pixel transistor 22 is connected to the gate line 11. A source electrode of the pixel transistor 22 is connected to the source line 12. A drain electrode of the pixel transistor 22 is connected to the pixel electrode 23. A capacitance is formed between the pixel electrode 23 and the counter electrode 24 arranged to face the pixel electrode 23.

As illustrated in FIG. 4, the display portion 2 includes the array substrate 41, a protective sheet 42, and an ink imaging film 43. The ink imaging film 43 is a Front Panel Laminate (FPL), and an electrophoretic ink technology is used. In addition, this technology is also referred to as electronic ink. The ink imaging film 43 includes a plurality of microcapsules 51, a plurality of charged particles 52*a* and 52*b*, a dispersion medium 53, and an insulating layer 54. The plurality of microcapsules 51 are arranged in the insulating layer 54. The plurality of charged particles 52*a* and 52*b* and the dispersion medium 53 are encapsulated in each of the plurality of microcapsules 51. The plurality of charged particles 52*a* and 52*b* include the charged particles 52*a* having white color and the charged particles 52*b* having black color. For example, the charged particles 52*a* having white color are positively charged, and the charged particles 52*b* having black color are negatively charged. The dispersion medium 53 is a liquid having an insulation property and is, for example, an organic solvent. The insulating layer 54 fills the inside of the ink imaging film 43. The insulating layer 54 is made of, for example, a polymeric resin material.

When the pixel transistor 22 is turned on by a drive signal (gate signal) supplied via the gate line 11, the source signal supplied via the source line 12 is written to (charged into) the pixel electrode 23. As a result, an electric field is generated between the pixel electrode 23 and the counter electrode 24, and in a case in which the pixel electrode 23 becomes positive and the counter electrode 24 becomes negative, the charged particles 52*b* having black color are attracted to the pixel electrode 23 and the charged particles 52*a* having white color are attracted to the counter electrode 24. In this case, the display device 100 displays white to a user who observes from a side of the counter electrode 24. Note that the counter electrode 24 is formed of an electrode (Indium Tin Oxide (ITO)) that transmits visible light.

Configuration of Gate Drive Circuit 1

Figure 5:
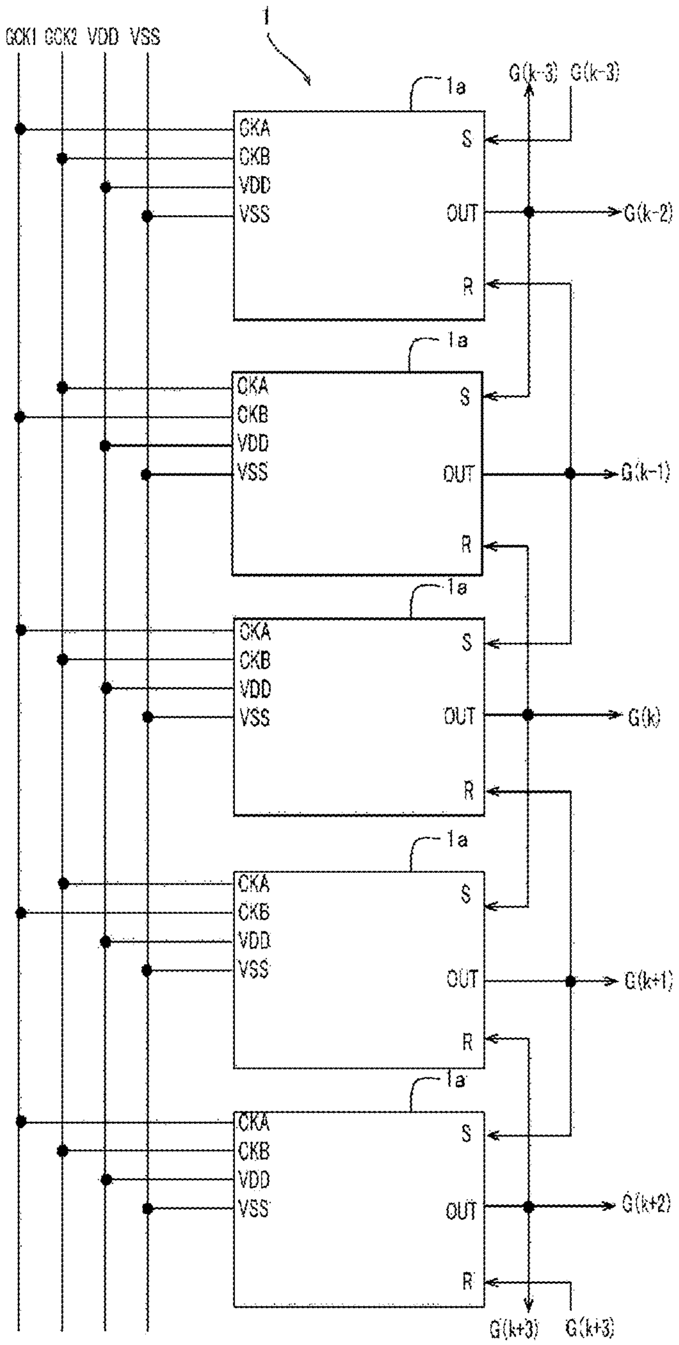
FIG. 5 is a diagram illustrating a configuration of a gate drive circuit 1.
Figure 6:
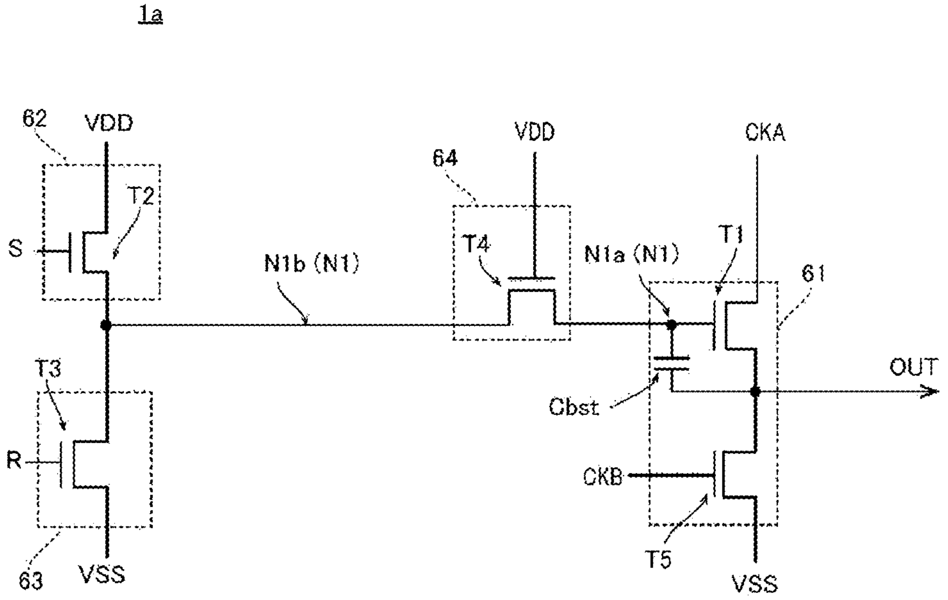
FIG. 6 is a circuit diagram illustrating a configuration of a unit circuit 1*a*.

FIG. 5 is a diagram illustrating a configuration of the gate drive circuit 1. FIG. 6 is a circuit diagram illustrating a configuration of a unit circuit 1*a*.

As illustrated in FIG. 5, the gate drive circuit 1 includes a shift register circuit constituted of a plurality of (n) stages and sequentially supplies the drive signals to the plurality of gate lines 11 in response to the input of clock signals CKA and CKB. The gate drive circuit 1 includes a plurality of unit circuits 1*a*, each of which constitutes one of the plurality of stages and outputs the drive signal to the gate line 11 connected thereto. The number of unit circuits 1*a* is the same as the number of gate lines 11. In FIG. 5, the plurality of unit circuits 1*a* from the (k (natural number)−2)-th stage to the (k+2)-th stage are illustrated.

The clock signals CKA and CKB, the VDD signal, and the VSS signal are input to the unit circuit 1*a* according to the first embodiment from the level shifter circuit 6. The drive signal output from a terminal OUT of the (k−1)-th unit circuit 1*a* is input to a terminal S of the k-th unit circuit 1*a* as a set signal. The drive signal output from a terminal OUT of the (k+1)-th unit circuit 1*a* is input to a terminal R of the k-th unit circuit 1*a* as a reset signal. Accordingly, when the gate start pulse signal as the set signal is input to the unit circuit 1*a* of the first stage, the drive signal is sequentially output to the plurality of gate lines 11 up to the unit circuit 1*a* of the n-th stage.

As illustrated in FIG. 6, the unit circuit 1*a* includes an output circuit 61, drive control circuits 62 to 64, and a node N1. The node N1 connects the output circuit 61 and the drive control circuits 62 to 64. The output circuit 61 is a circuit that outputs the drive signal to the gate line 11 connected to the unit circuit 1*a*. The drive control circuit 62 is a circuit that increases (charges) the potential of the node N1 in response to the input of the set signal. The drive control circuit 63 is a circuit that decreases (discharges) the potential of the node N1 in response to the input of the reset signal. The drive control circuit 64 is a circuit for separating the node N1 into a first portion N1*a* and a second portion N1*b*.

The output circuit 61 includes a transistor T1, a transistor T5, and a bootstrap capacitor Cbst. The transistor T1 is a transistor that outputs the drive signal to the gate line 11 in response to the clock signal CKA. The transistor T5 is a transistor that decreases (pulls down) the potential of the gate line 11 to the level of the VSS signal in response to the clock signal CKB. The bootstrap capacitor Cost is a capacitor that turns on the transistor T1 by a potential increased by being charged.

A gate electrode of the transistor T1 is connected to the first portion N1*a* of the node N1. A source electrode of the transistor T1 is connected to a terminal to which the clock signal CKA is input. A drain electrode of the transistor T1 is connected to the terminal OUT from which the drive signal is output. One end of the bootstrap capacitor Cost is connected to the gate electrode of the transistor T1, and the other end of the bootstrap capacitor Cbst is connected to the drain electrode of the transistor T1. A gate electrode of the transistor T5 is connected to a terminal to which the clock signal CKB is input. A source electrode of the transistor T5 is connected to a terminal to which the VSS signal is input. A drain electrode of the transistor T5 is connected to the terminal OUT from which the drive signal is output.

The drive control circuit 62 includes a transistor T2. A gate electrode of the transistor T2 is connected to the terminal S to which the set signal is input. A source electrode of the transistor T2 is connected to a terminal to which the VDD signal is input. A drain electrode of the transistor T2 is connected to the second portion N1*b* of the node N1.

The drive control circuit 63 includes a transistor T3. A gate electrode of the transistor T3 is connected to the terminal R to which the reset signal is input. A source electrode of the transistor T3 is connected to a terminal to which the VSS signal is input. A drain electrode of the transistor T3 is connected to the second portion N1*b* of the node N1.

The drive control circuit 64 includes a transistor T4. A gate electrode of the transistor T4 is connected to a terminal to which the VDD signal is input. A source electrode of the transistor T4 is connected to the second portion N1*b*. A drain electrode of the transistor T4 is connected to the first portion N1*a*.

Each semiconductor layer of the transistors T1 to T5 includes an oxide semiconductor. For the oxide semiconductor, an In—Ga—Zn—O-based oxide semiconductor having crystallinity can be used. According to this configuration, power consumption can be reduced, driving speed can be increased, and high definition can be achieved as compared with the case in which each transistor is made of amorphous silicon.

Operation of Unit Circuit 1*a*

Figure 7:
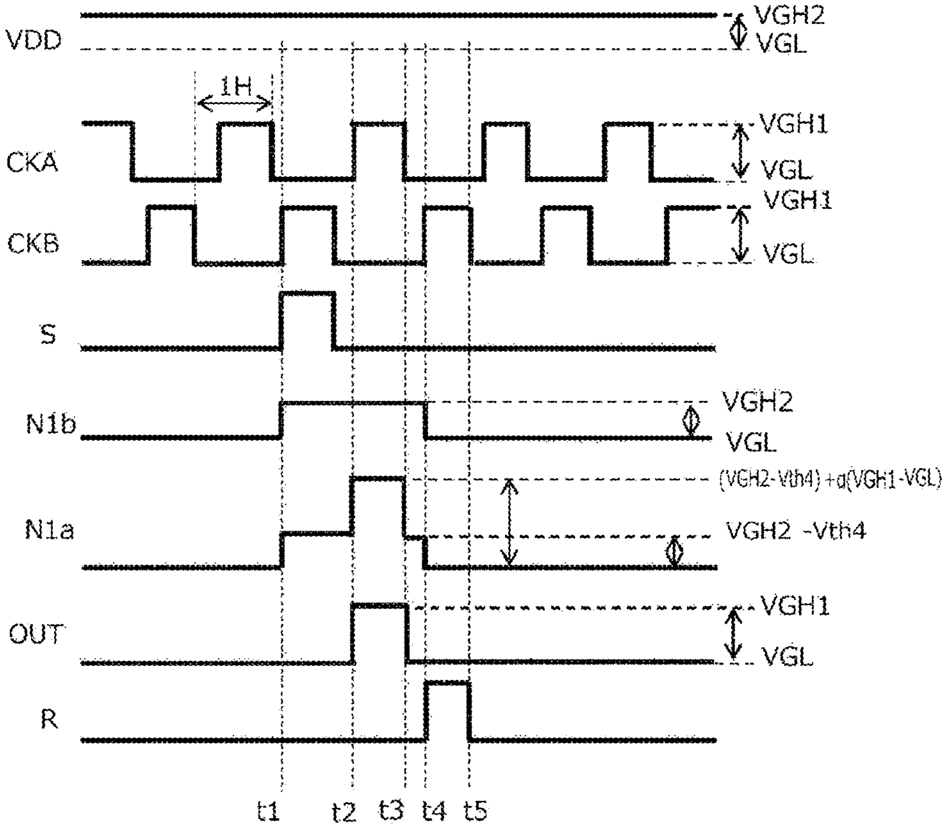
FIG. 7 is a timing chart for describing an operation of the gate drive circuit 1 (unit circuit 1*a*).

FIG. 7 is a timing chart for describing an operation of the gate drive circuit 1 (unit circuit 1*a*). As illustrated in FIG. 7, in the period before time t1, the potentials of the first portion N1*a*, the second portion N1*b*, and the terminal OUT are maintained at a low-level (the potential of the gate-off voltage VGL). The clock signal CKA and the clock signal CKB alternately become a high-level (the potential of the first gate-on voltage VGH1) each time a horizontal synchronization signal (1H) is input. The clock signal CKA has a phase shifted by 180 degrees with respect to the clock signal CKB. An amplitude A1 between the high-level and the low-level of the clock signal CKA and the clock signal CKB is equal to the difference value between the first gate-on voltage VGH1 and the gate-off voltage VGL. Note that the high-level is a state having a voltage value of either the first gate-on voltage VGH1 or the second gate-on voltage VGH2, and the low-level is a state having a voltage value of the gate-off voltage VGL.

Here, in the first embodiment, the voltage value of the VDD signal is equal to the voltage value of the second gate-on voltage VGH2. In addition, the voltage value of the VSS signal is equal to the voltage value of the gate-off voltage VGL. As described above, the voltage values have the relationship VGH1>VGH2>VGL. Therefore, a difference value Vd1 between the second gate-on voltage VGH2 and the gate-off voltage VGL is smaller than the amplitude A1.

At time t1, the set signal is input, and the potential of the terminal S changes from the low-level to the high-level. This causes the transistor T2 (see FIG. 6) to turn on, and the second portion N1*b* is charged to the second gate-on voltage VGH2. At the time t1, the transistor T4 is also turned on. As a result, when a threshold voltage of the transistor T4 is Vth4, the first portion N1*a* is charged from the low-level to the second gate-on voltage VGH2 minus the threshold voltage of the transistor T4 (VGH2−Vth4). Further, the first portion N1*a* is turned into a floating state. When the potential of the first portion N1*a* increases, the transistor T1 is turned on. However, since the clock signal CKA is at the low-level, the potential of the terminal OUT is maintained at the low-level.

At time t2, the clock signal CKA changes from the low-level to the high-level. Accordingly, since the transistor T1 is in an on state, the potential of the terminal OUT rises from the low-level to the high-level. At this time, since the first portion N1*a* is in a floating state, the potential of the first portion N1*a* becomes higher by α×(VGH1−VGL) from the potential of (VGH2−Vth4) due to coupling between the capacitance of the bootstrap capacitor Cost and the on-capacitance of the transistor T1 (bootstrap operation). That is, the potential of the first portion N1*a* is (VGH2−Vth4)+α×(VGH1−VGL). Here, "x" is a coupling ratio of the first portion N1*a*, and α=(capacitance of bootstrap capacitor Cbst+on-capacitance of transistor T1)/(total capacitance of first portion N1*a*). As a result, since the transistor T1 is kept in the on state, the change in the clock signal CKA is directly output as the drive signal from the terminal OUT.

At time t3, when the clock signal CKA changes from the high-level to the low-level, the potential of the terminal OUT decreases from the high-level to the low-level. Thus, the voltage of the first portion N1*a* which has been increased by the bootstrap operation is decreased to the potential of (VGH2−Vth4) before the increase.

At time t4, when the reset signal changes from the low-level to the high-level, the transistor T3 is turned on, and the second portion N1*b* is discharged from the second gate-on voltage VGH2 to the low-level. Then, the first portion N1*a* is discharged from the potential of (VGH2−Vth4) to the low-level.

Figure 8:
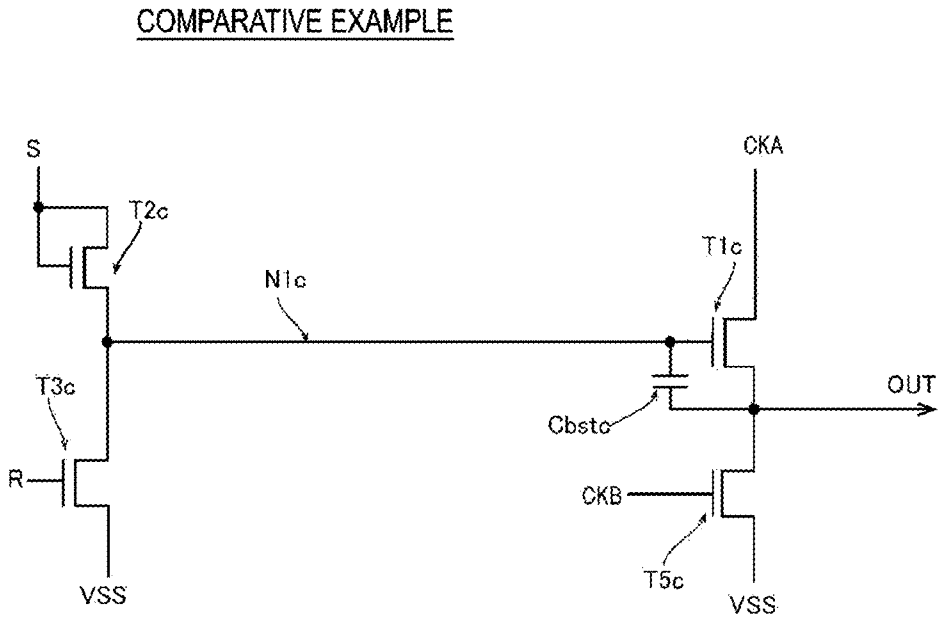
FIG. 8 is a circuit diagram illustrating a configuration of a unit circuit according to a comparative example.

Comparison Result Between Example According to First Embodiment and Comparative Example Next, a comparison result between the unit circuit 1*a* according to an example of the first embodiment and a unit circuit according to a comparative example will be described. FIG. 8 is a circuit diagram illustrating a configuration of the unit circuit according to the comparative example. The unit circuit according to the comparative example is configured to describe the effects of the example and is not intended to describe a known technique.

As illustrated in FIG. 8, the unit circuit according to the comparative example includes transistors T1*c*, T2*c*, T3*c*, and T5*c*, a node N1*c*, and a bootstrap capacitor Cbstc. In the comparative example, the set signal is input to a gate electrode and a source electrode of the transistor T2*c*. The materials and characteristics of the transistors T1*c*, T2*c*, T3*c*, and T5*c* are the same as the transistors T1, T2, T3, and T5, respectively.

Here, in a case in which a threshold voltage of the transistor T2*c* is Vth2, the voltage applied between the source electrode and a drain electrode of the transistor T2*c* (referred to as "stress voltage Vds") and the stress voltage Vds applied to the transistor T3*c* are expressed by the following Equation (1). Note that, Vdc is a difference value between the voltage value applied to the source electrode of the transistor T2*c* and the potential of the VSS signal, a is a coupling ratio, and A1 is the amplitude of the clock signal CKA. In addition, Vth2 is a value smaller than Vdc and A1.

$$Vds=Vdc-Vth2+\alpha\times A1 \tag{1}$$

Further, a voltage applied between a gate electrode and a source electrode of the transistor T1*c* (referred to as "stress voltage Vgs") is expressed by the following Equation (2).

$$Vgs=Vdc-Vth2+(\alpha-1)\times A1 \tag{2}$$

In the case of the comparative example, the high-level of the set signal is the same as the level (first gate-on voltage VGH1) of the drive signal of the previous stage. Thus, Vdc is equal to the difference value between the first gate-on voltage VGH1 and the gate-off voltage VGL. Accordingly, A1 becomes equal to Vdc, and the stress voltage Vds becomes (1+α)×A1−Vth2. Further, the voltage Vgs becomes α×Vdc−Vth2. In the unit circuit of the comparative example, when VGH1=40 V, VGL=−40 V, A1=80 V, α=0.9, and Vth2=2 V, then Vds becomes 150 V. In addition, Vgs becomes 70 V.

Therefore, in the unit circuit of the comparative example, when such a high stress voltage is applied to the transistor, there is a high possibility that deterioration is accelerated.

In the unit circuit 1*a* according to the example of the first embodiment, since the transistor T4 (see FIG. 6) that separates the node N1 is provided, the stress voltage Vds applied to the transistor T2 and the stress voltage Vds applied to the transistor T3 are expressed by the following Equation (3). In addition, when the threshold voltage of the transistor T4 is Vth4, the stress voltage Vgs applied to the transistor T1 is expressed by the following Equation (4). Note that Vth4 is a value smaller than Vd1 and A1. In addition, Vd1 is a difference value between the voltage value applied to the source electrode of the transistors T2 and the potential of the VSS signal, x is the coupling ratio, and A1 is the amplitude of the clock signal CKA.

$$Vds=Vd1 \tag{3}$$

$$Vgs=Vd1-Vth4+(\alpha-1)\times A1 \tag{4}$$

Here, Vd1 is equal to the difference value between the second gate-on voltage VGH2 and the gate-off voltage VGL. In the unit circuit 1*a* according to the example, when VGH1=40 V, VGH2=0 V, VGL=−40 V, A1=80 V, α=0.9, and Vth4=2 V, then Vds becomes 40 V. Further, Vgs becomes 30 V.

While Vds of the comparative example is 150 V, Vds of the example becomes 40 V. In addition, while Vgs of the comparative example is 70 V, Vgs of the example becomes 30 V. In this way, since the voltage applied to the transistors T1 to T3 can be reduced, a rate at which the transistors T1 to T3 deteriorate can be reduced.

Second Embodiment

Next, a configuration of a gate drive circuit 201 according to a second embodiment will be described with reference to FIGS. 9 and 10. In a unit circuit 201*a* of the second embodiment, a drive control circuit 265 (stabilization circuit) is further provided in the unit circuit 1*a* of the first embodiment. Note that the same configurations as those of the first embodiment will be denoted by the same reference signs as those of the first embodiment, and descriptions thereof will be omitted.

Figure 9:
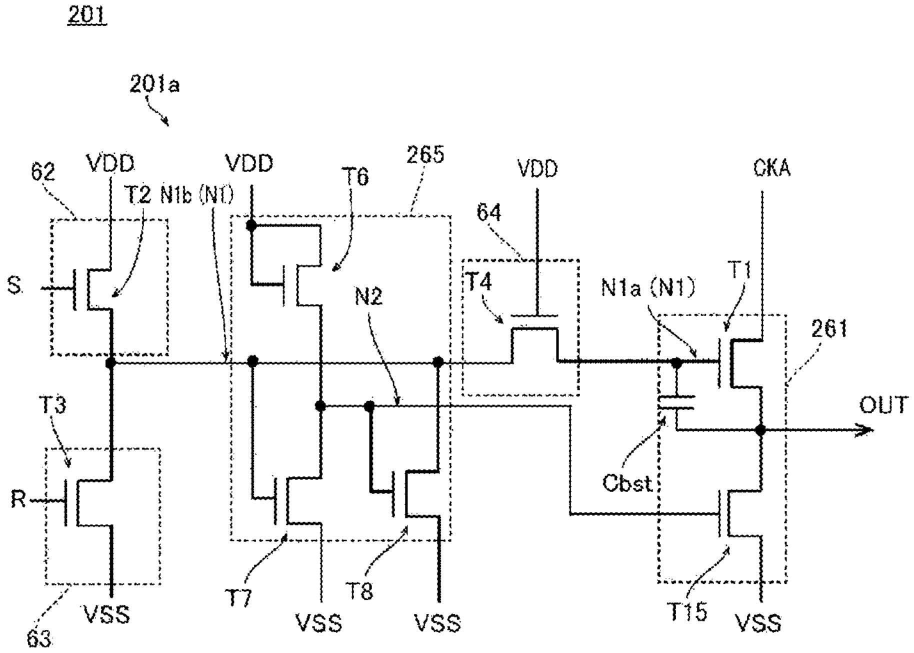
FIG. 9 is a circuit diagram illustrating a configuration of a gate drive circuit 201 according to a second embodiment.

FIG. 9 is a circuit diagram illustrating the configuration of the gate drive circuit 201 according to the second embodiment. As illustrated in FIG. 9, the gate drive circuit 201 according to the second embodiment includes the unit circuit 201*a*. The unit circuit 201*a* includes a node N2, an output circuit 261, and the drive control circuit 265. The output circuit 261 includes a transistor T15. Unlike the transistor T5 according to the first embodiment, the transistor T15 includes a gate electrode connected to the node N2.

The drive control circuit 265 includes transistors T6 to T8. A source electrode and a gate electrode of the transistor T6 are connected to a terminal to which a VDD signal is input. A drain electrode of the transistor T6 is connected to the node N2. A gate electrode of the transistor T7 is connected to a second portion N1*b* of a node N1. A source electrode of the transistor T7 is connected to a terminal to which a VSS signal is supplied. A drain electrode of the transistor T7 is connected to the node N2. A gate electrode of the transistor T8 is connected to the node N2. A source electrode of the transistor T8 is connected to a terminal to which the VSS signal is supplied. A drain electrode of the transistor T8 is connected to the second portion N1*b* of the node N1.

Figure 10:
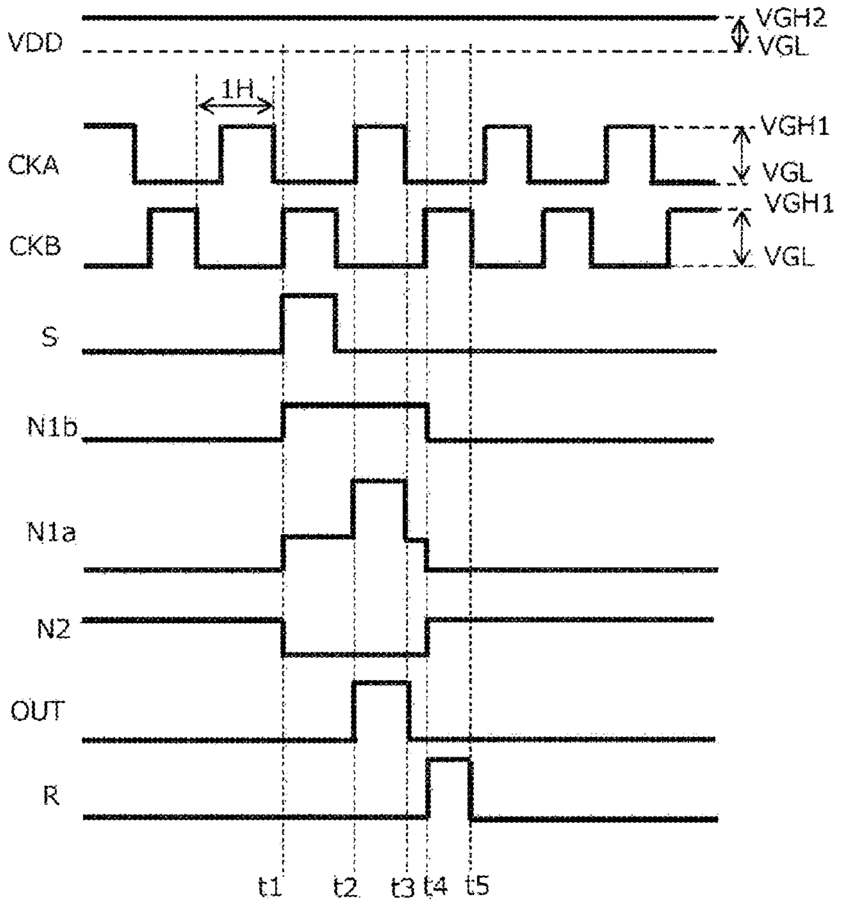
FIG. 10 is a timing chart for describing an operation of a unit circuit 201*a* according to the second embodiment.

FIG. 10 is a timing chart for describing an operation of the unit circuit 201*a* according to the second embodiment. As illustrated in FIG. 10, the operation of the unit circuit 201*a* from time t1 to time t4 is the same as the operation from the time t1 to the time t4 illustrated in FIG. 7. In a period before time t1 and after time t4, a first portion N1*a* and the second portion N1*b* of the node N1 are always pulled down by the transistor T8 (not brought into a floating state but maintained in a VGL state). In addition, in a period before the time t1 and after the time t4, the potential of a terminal OUT is always pulled down by the transistor T5 (not brought into a floating state but maintained in the VGL state). Note that, in the first embodiment, the node N1 is in a floating state in a period before the time t1 and after the time t4, and the terminal OUT is pulled down only in a 50% period (at a duty of 50%) in which the clock signal CKB is input.

Here, in a case in which the node N1 is in a floating state, the potential of the node N1 may fluctuate due to noise of the clock signal or other signals, and noise may be generated in a drive signal output from the gate drive circuit in some cases. In contrast, according to the second embodiment, the node N1 can be prevented from being brought into a floating state, and therefore the potential of the node N1 can be prevented from fluctuating due to noise of the clock signal CKA or other signals. As a result, noise can be prevented from being generated in the drive signal output from the gate drive circuit 201. Note that, other configurations and effects according to the second embodiment are the same as the configurations and effects according to the first embodiment.

Third Embodiment

Next, a configuration of a display device 300 according to a third embodiment will be described with reference to FIGS. 11 to 15. A gate drive circuit 301 of the third embodiment is configured to be capable of not only sequentially transmitting a drive signal to a plurality of gate lines 11 from the first stage to the n-th stage (final stage) (referred to as "forward scanning") but also sequentially transmitting the drive signal to the plurality of gate lines 11 from the n-th stage to the first stage (referred to as "reverse scanning"). Note that the same configurations as those of the first embodiment will be denoted by the same reference signs as those of the first embodiment, and descriptions thereof will be omitted.

Figure 11:
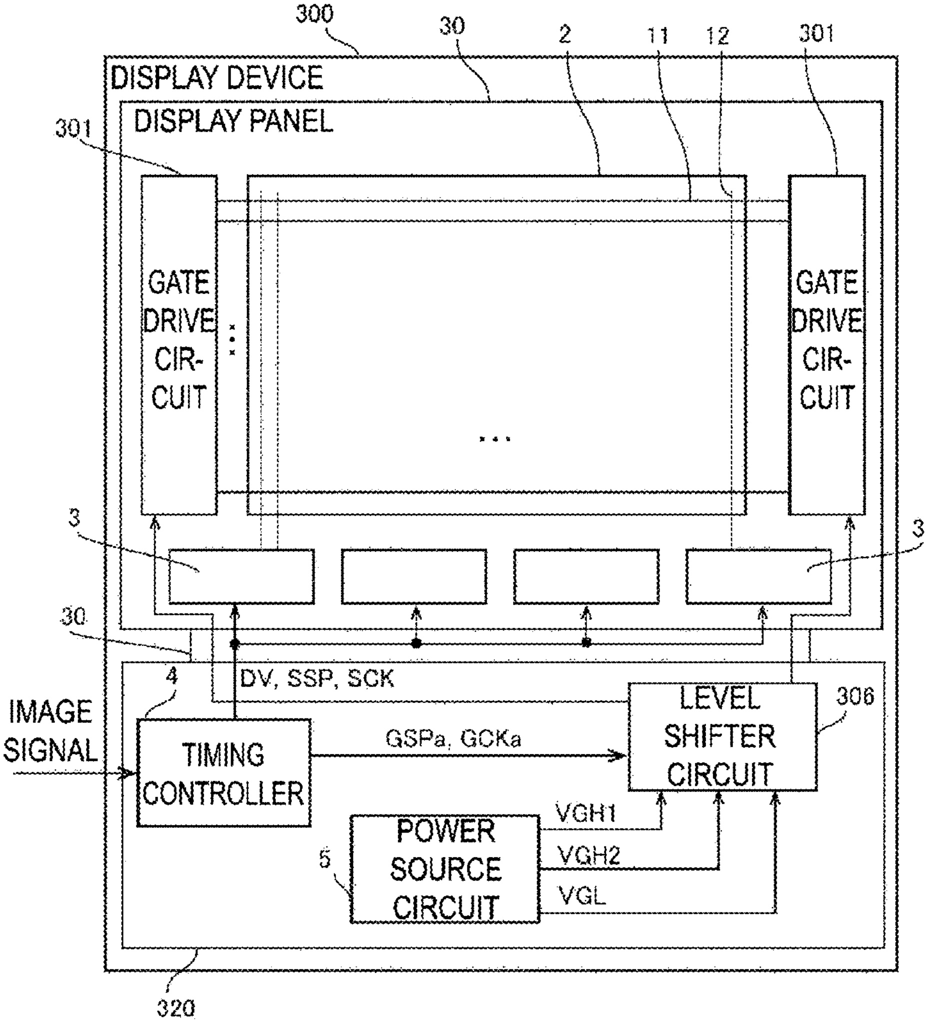
FIG. 11 is a block diagram illustrating a configuration of a display device 300 according to a third embodiment.
Figure 12:
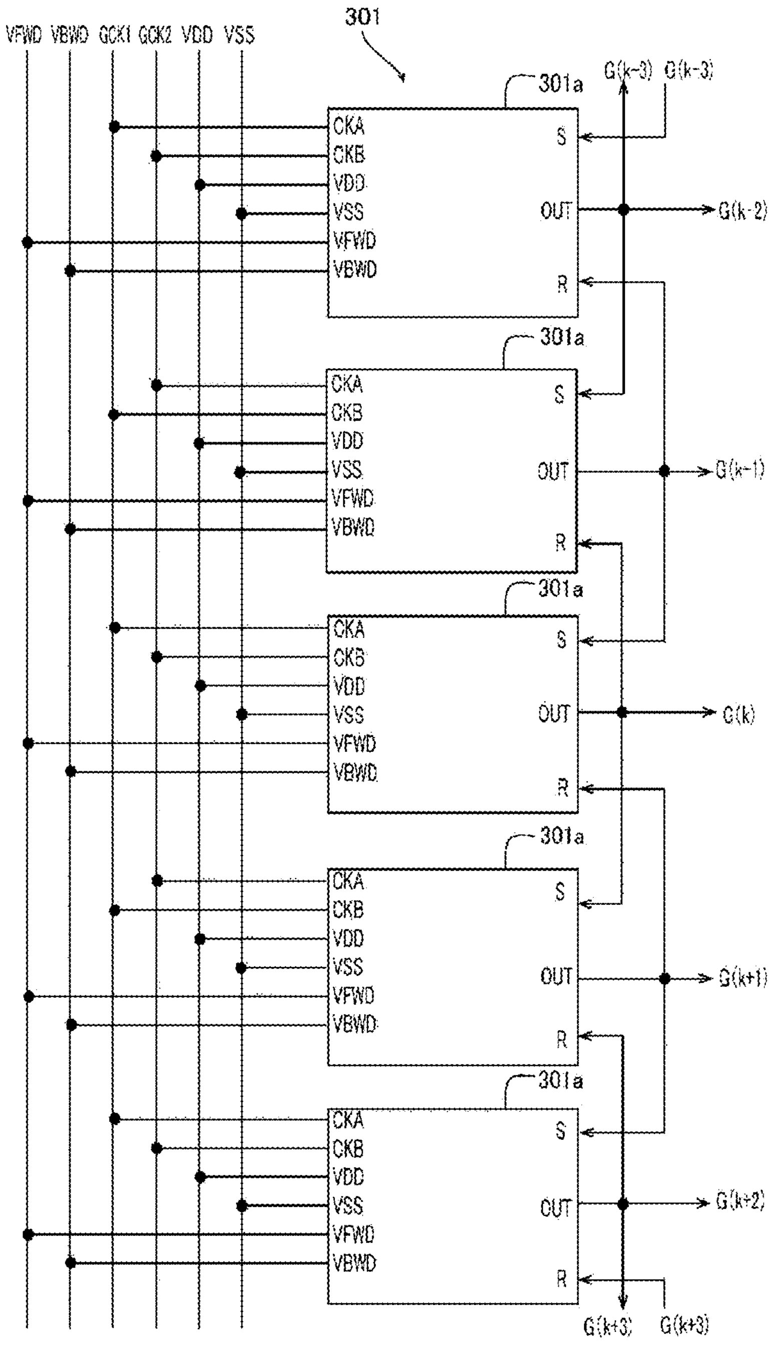
FIG. 12 is a diagram illustrating a configuration of a gate drive circuit 301 according to the third embodiment.
Figure 13:
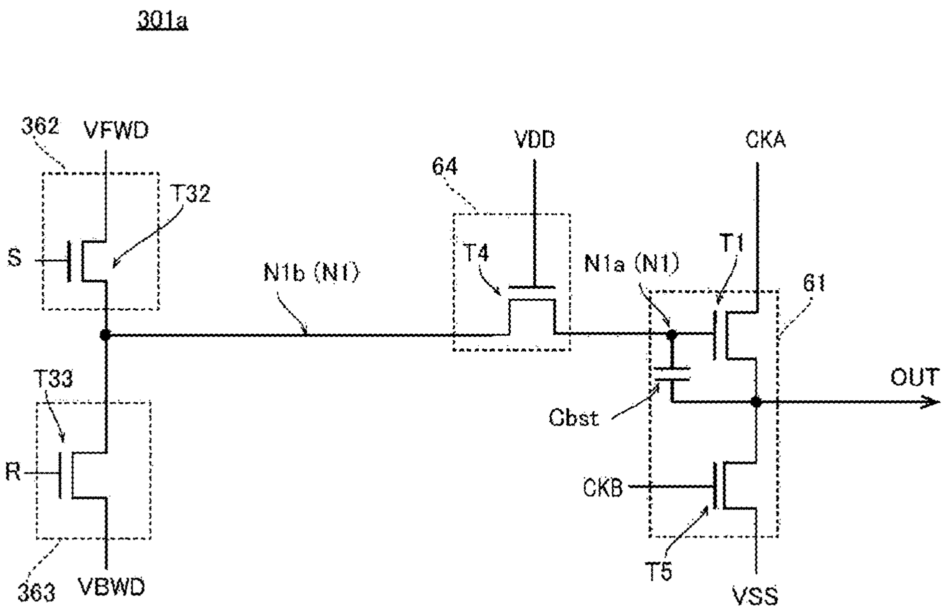
FIG. 13 is a block diagram illustrating a configuration of a unit circuit 301*a* according to the third embodiment.

FIG. 11 is a block diagram illustrating the configuration of the display device 300 according to the third embodiment. FIG. 12 is a diagram illustrating a configuration of the gate drive circuit 301 according to the third embodiment. FIG. 13 is a block diagram illustrating a configuration of a unit circuit 301*a* according to the third embodiment.

As illustrated in FIG. 11, the display device 300 includes the gate drive circuit 301 and a level shifter circuit 306 provided on a control board 320. The level shifter circuit 306 outputs a VFWD signal and a VBWD signal in addition to a signal output from the level shifter circuit 6 according to the first embodiment. In a case in which the forward scanning is performed, the level shifter circuit 306 sets the level of the VFWD signal to a second gate-on voltage VGH2 and sets the level of the VBWD signal to a gate-off voltage VGL. In a case in which the reverse scanning is performed, the level shifter circuit 306 sets the level of the VFWD signal to the gate-off voltage VGL and sets the level of the VBWD signal to the second gate-on voltage VGH2.

As illustrated in FIG. 12, the VFWD signal and the VBWD signal are input to each unit circuit 301*a* in the gate drive circuit 301. As illustrated in FIG. 13, the unit circuit 301*a* includes a drive control circuit 362 including a transistor T32 and a drive control circuit 363 including a transistor T33. Unlike the transistor T2 according to the first embodiment, the VFWD signal is input to a source electrode of the transistor T32. Unlike the transistor T3 according to the first embodiment, the VBWD signal is input to a source electrode of the transistors T33.

Figure 14:
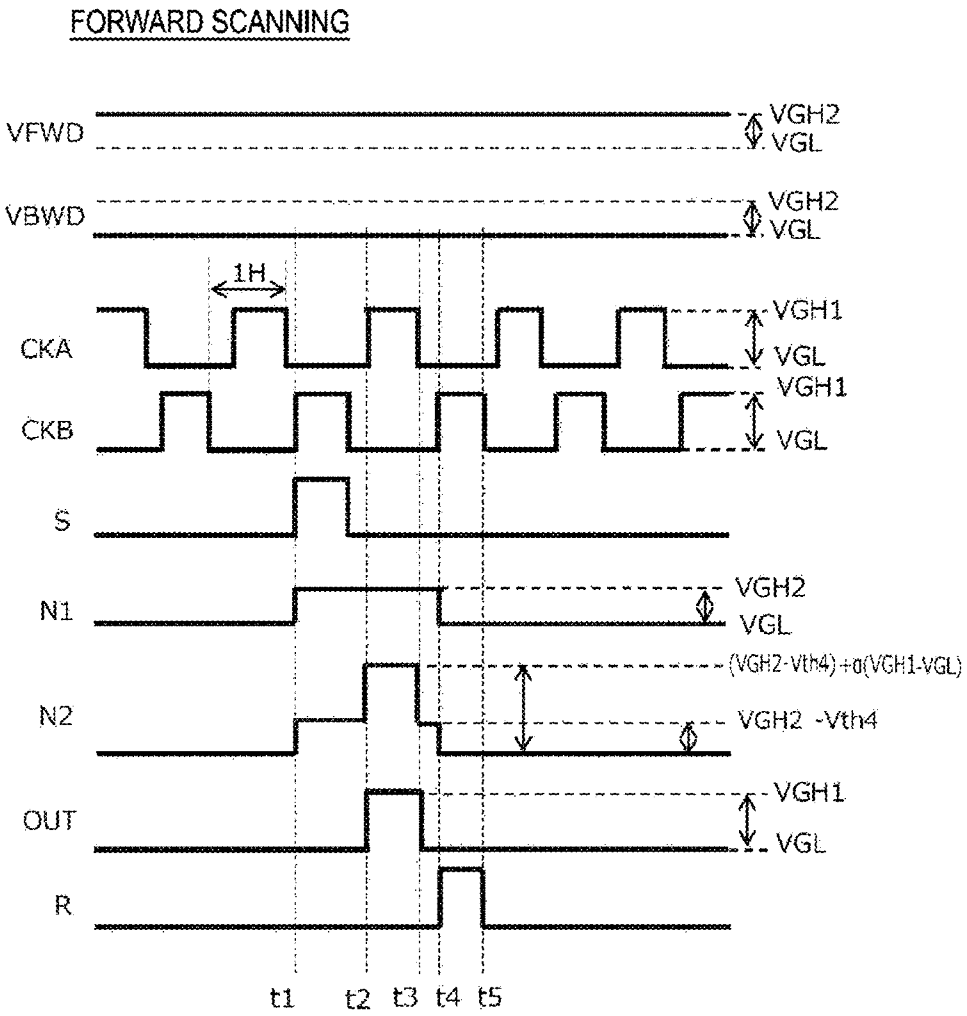
FIG. 14 is a timing chart for describing an operation of the unit circuit 301*a* (forward scanning) according to the third embodiment.
Figure 15:
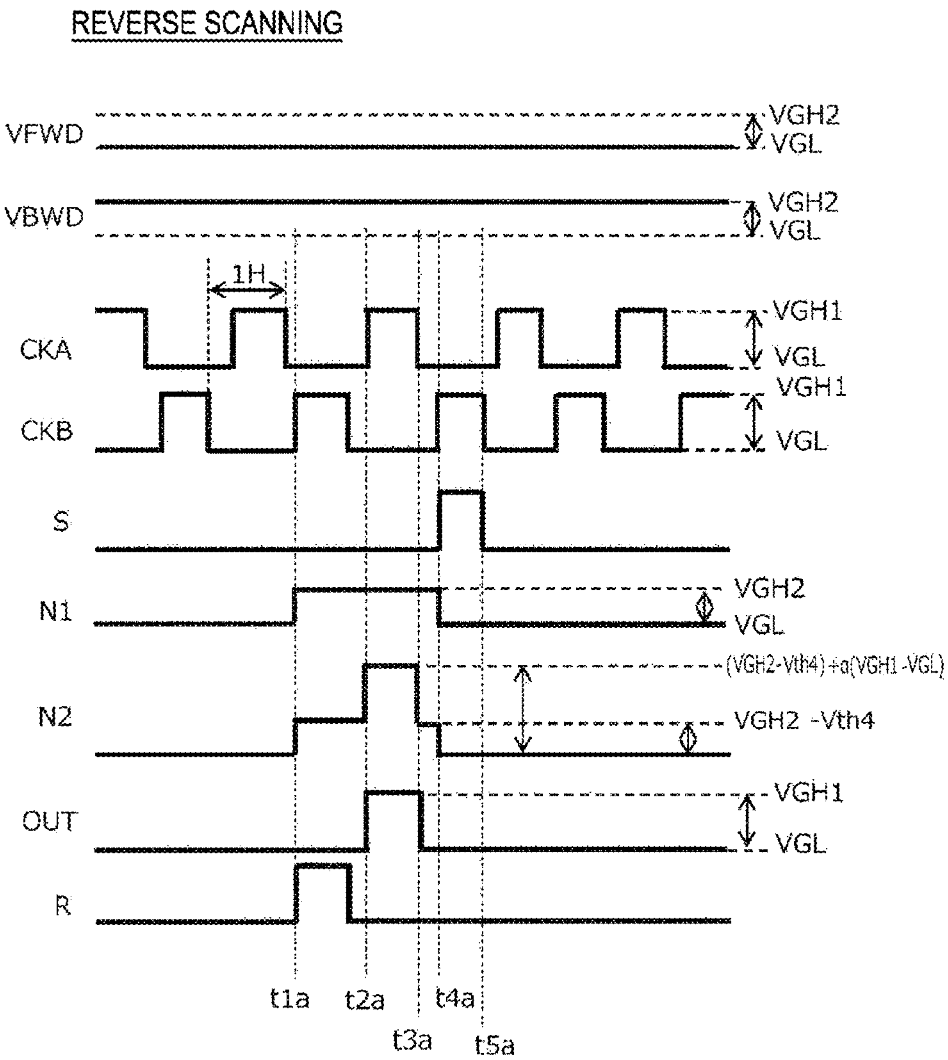
FIG. 15 is a timing chart for describing an operation of the unit circuit 301*a* (reverse scanning) according to the third embodiment.

FIG. 14 is a timing chart for describing an operation (forward scanning) of the unit circuit 301*a* according to the third embodiment. FIG. 15 is a timing chart for describing an operation (reverse scanning) of the unit circuit 301*a* according to the third embodiment. As illustrated in FIG. 14, in a case in which the forward scanning is performed, since the level of the VFWD signal becomes the second gate-on voltage VGH2 and the level of the VBWD signal becomes the gate-off voltage VGL, the operation of the unit circuit 301*a* is the same as that of the unit circuit 1*a* according to the first embodiment (see FIG. 7). As illustrated in FIG. 15, in a case in which the reverse scanning is performed, the level of the VFWD signal becomes the gate-off voltage VGL, and the level of the VBWD signal becomes the second gate-on voltage VGH2. Therefore, the signal input to a terminal R functions as a set signal, and the signal input to a terminal S functions as a reset signal. Thus, a plurality of unit circuits 301*a* sequentially operate from the final stage (n-th stage) toward the first stage. That is, at time t1*a*, the level of the terminal R becomes a high-level. Each of the potentials at time t2*a* and t3*a* are the same as each of the potentials at the time t2 and the time t3 in FIG. 7. At time t4*a*, the potential of the terminal S changes from a low-level to the high-level. At time t5*a*, the potential of the terminal S changes from the high-level to the low-level.

A difference value between the level of the VFWD signal and the level of the VBWD signal is VGH2−VGL, and the difference value is smaller than A1. Thus, also in the configuration capable of bidirectional scanning according to the third embodiment, a rate at which the transistor T1, the transistor T32, and the transistor T33 deteriorate can be reduced. Note that the same configurations as those of the first embodiment will be denoted by the same reference signs as those of the first embodiment, and descriptions thereof will be omitted.

Fourth Embodiment

Next, a configuration of a gate drive circuit 401 according to a fourth embodiment will be described with reference to FIG. 16. The fourth embodiment is a configuration in which the drive control circuit 265 (stabilization circuit) of the second embodiment and the configuration capable of bidirectional scanning of the third embodiment are combined.

Note that the same configurations as those of any one of the first to third embodiments will be denoted by the same reference signs as those of any one of the first to third embodiments, and descriptions thereof will be omitted.

Figure 16:
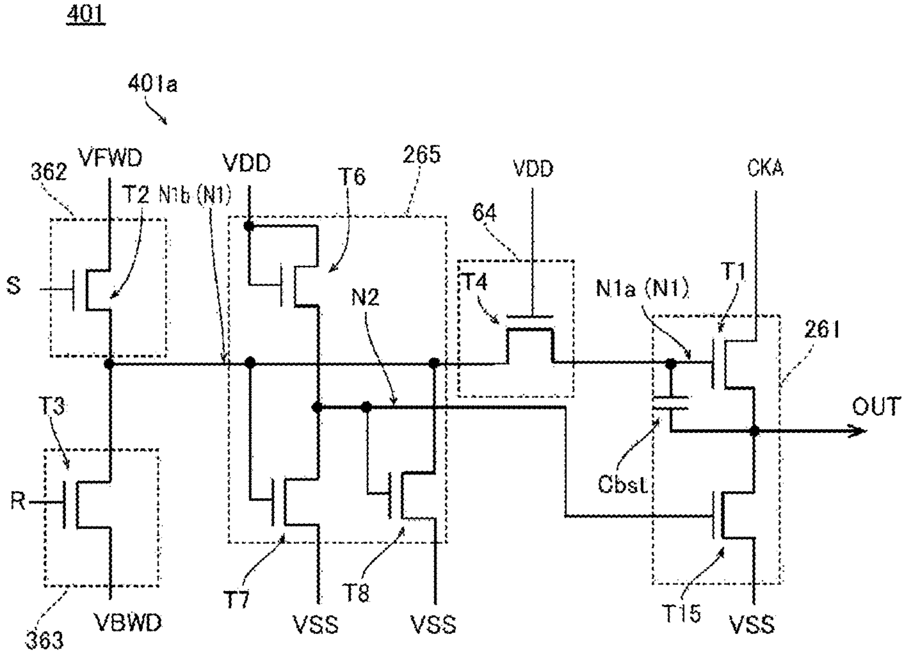
FIG. 16 is a circuit diagram illustrating a configuration of a gate drive circuit 401 according to a fourth embodiment.

FIG. 16 is a circuit diagram illustrating the configuration of the gate drive circuit 401 according to the fourth embodiment. As illustrated in FIG. 16, a unit circuit 401*a* of the gate drive circuit 401 includes an output circuit 261 and drive control circuits 265, 362, and 363. Thus, according to the fourth embodiment, both the effects of the second embodiment and the effects of the third embodiment can be achieved.

Fifth Embodiment

Next, a configuration of a gate drive circuit 501 according to a fifth embodiment will be described with reference to FIG. 17. In the fifth embodiment, unlike in the first embodiment, the drive control circuit 64 is not provided. Thus, the number of elements can be reduced as compared with the gate drive circuit 1 in the first embodiment. Note that the same configurations as those of the first embodiment will be denoted by the same reference signs as those of the first embodiment, and descriptions thereof will be omitted.

Figure 17:
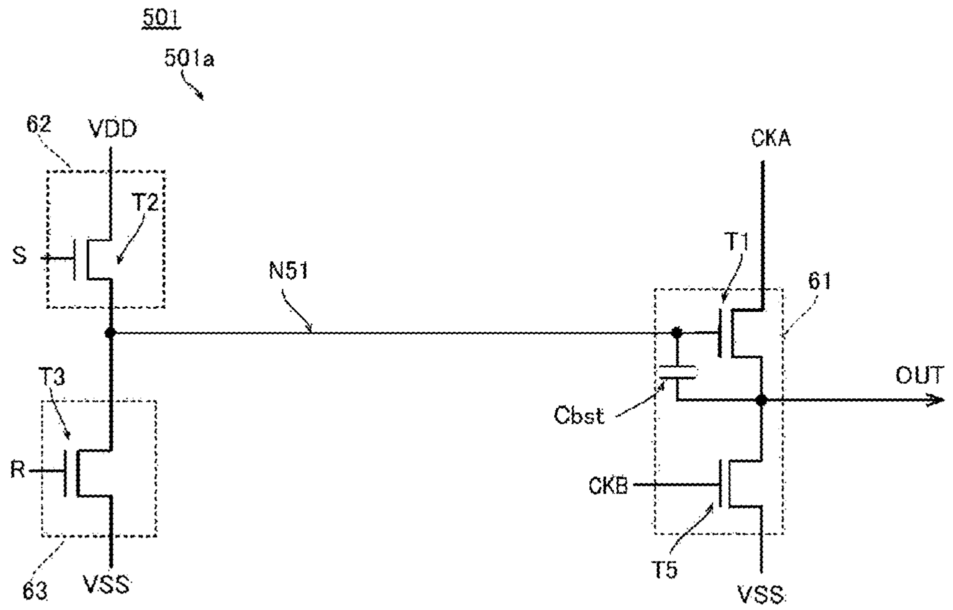
FIG. 17 is a circuit diagram illustrating a configuration of a gate drive circuit 501 according to a fifth embodiment.

FIG. 17 is a circuit diagram illustrating the configuration of the gate drive circuit 501 according to the fifth embodiment. A unit circuit 501*a* of the gate drive circuit 501 includes a node N51. Since a transistor T4 is not provided in the fifth embodiment, the node N51 in which the first portion N1*a* and the second portion N1*b* according to the first embodiment are directly connected to each other is formed. Note that, a stress voltage Vds applied to a transistor T2 and the stress voltage Vds applied to a transistor T3 are expressed by the following Equation (5). Here, it is assumed that VGH>VGH2 and the voltage difference is sufficiently greater than a threshold voltage Vth2 of the transistor T2. A voltage Vgs applied to a gate electrode of a transistor T1 is expressed by the following Equation (6). Here, using the same numerical values as in the above-described example and the comparative example, Vds becomes 112 V and Vgs becomes 32 V. That is, while Vds in the comparative example is 150 V and Vgs in the comparative example is 70 V, the voltage applied to the transistors T1 to T3 can be reduced in the fifth embodiment.

$$Vds=(VGH2+\alpha\times A1)-(VGL)=Vd1+\alpha\times A1 \quad (5)$$

$$Vgs=(VGH2+\alpha\times A1)-(VGH)=Vd1+(\alpha-1)\times A1 \quad (6)$$

Sixth Embodiment

Next, a configuration of a gate drive circuit 601 according to a sixth embodiment will be described with reference to FIG. 18. In the sixth embodiment, transistors T62 to T64 each include two thin film transistors connected in series. Note that the same configurations as those of the first embodiment will be denoted by the same reference signs as those of the first embodiment, and descriptions thereof will be omitted.

Figure 18:
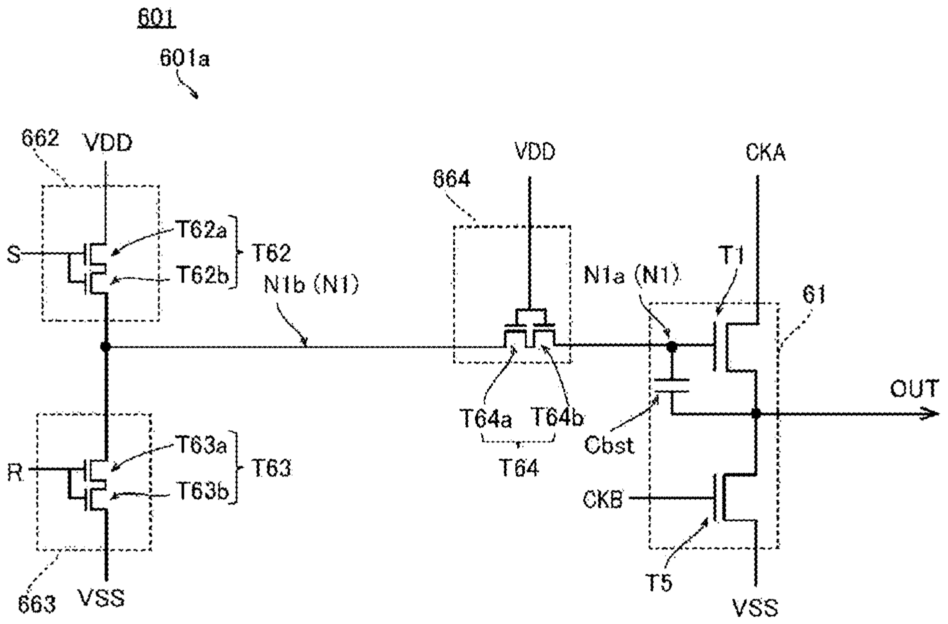
FIG. 18 is a circuit diagram illustrating a configuration of a gate drive circuit 601 according to a sixth embodiment.

FIG. 18 is a circuit diagram illustrating the configuration of the gate drive circuit 601 according to the sixth embodiment. As illustrated in FIG. 18, a unit circuit 601*a* of the gate drive circuit 601 includes drive control circuits 662 to 664. The drive control circuit 662 includes the transistor T62. The drive control circuit 663 includes the transistor T63. The drive control circuit 664 includes the transistor T64. The transistor T62 includes thin film transistors T62*a* and T62*b*.

The transistor T63 includes thin film transistors T63*a* and T63*b*. The transistor T64 includes thin film transistors T64*a* and T64*b*.

A gate electrode of the thin film transistor T62*a* is connected to a gate electrode of the thin film transistor T62*b*. In addition, the thin film transistors T62*a* and T62*b* are connected in series and a drain electrode of the thin film transistor T62*a* is connected to a source electrode of the thin film transistor T62*b*. Thus, a source electrode of the thin film transistor T62*a* functions as a source electrode of the transistors T62, and a drain electrode of the thin film transistor T62*b* functions as a drain electrode of the transistors T62. The function of the transistor T62 is the same as that of the transistor T2 according to the first embodiment.

A gate electrode of the thin film transistor T63*a* is connected to a gate electrode of the thin film transistor T63*b*. The thin film transistors T63*a* and T63*b* are connected in series, and a source electrode of the thin film transistor T63*a* and a drain electrode of the thin film transistor T63*b* are connected. Thus, a drain electrode of the thin film transistor T63*a* functions as a drain electrode of the transistor T63, and a source electrode of the thin film transistor T63*b* functions as a source electrode of the transistor T63. The function of the transistor T63 is the same as that of the transistor T3 according to the first embodiment.

A gate electrode of the thin film transistor T64*a* is connected to a gate electrode of the thin film transistor T64*b*. The thin film transistors T64*a* and T64*b* are connected in series, and a drain electrode of the thin film transistor T64*a* is connected to the source electrode of the thin film transistor T63*b*. Thus, a source electrode of the thin film transistor T64*a* functions as a source electrode of the transistor T64, and a drain electrode of the thin film transistor T64*b* functions as a drain electrode of the transistor T64. The function of the transistor T64 is the same as that of the transistor T4 according to the first embodiment.

According to the sixth embodiment, the stress voltage applied to each of the thin film transistors constituting the transistors T62 to T64 can be reduced. Other configurations and effects according to the sixth embodiment are the same as the configurations and effects according to the first embodiment.

Seventh Embodiment

Figure 19:
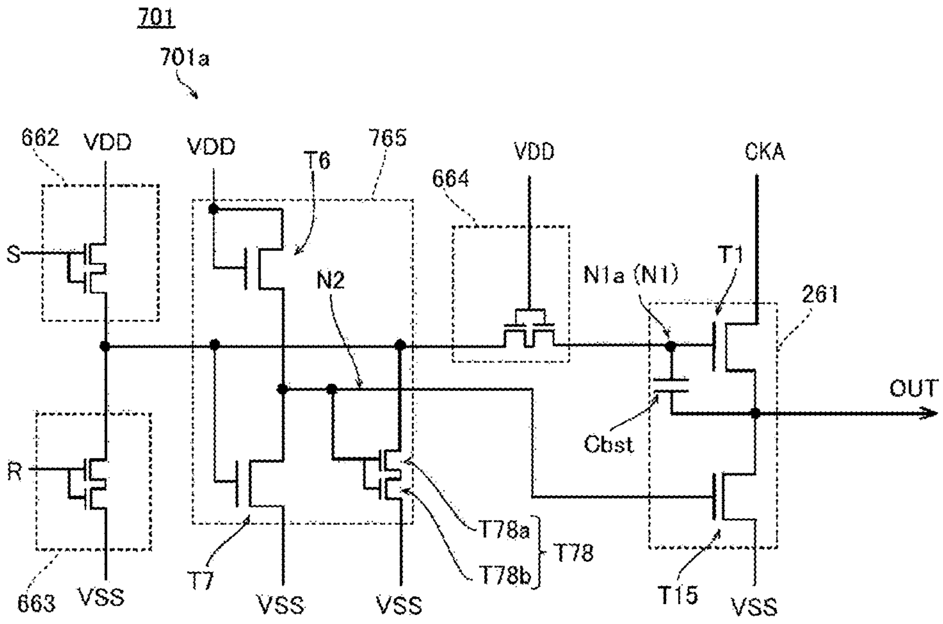
FIG. 19 is a circuit diagram illustrating a configuration of a gate drive circuit 701 according to a seventh embodiment.

Next, a configuration of a gate drive circuit 701 according to a seventh embodiment will be described with reference to FIG. 19. The seventh embodiment is a combination of the configuration of the second embodiment (stabilization circuit) and the configuration of the sixth embodiment. FIG. 19 is a circuit diagram illustrating the configuration of the gate drive circuit 701 according to the seventh embodiment. Note that the same configurations as those of any one of the first to sixth embodiments will be denoted by the same reference signs as those of any one of the first to sixth embodiments, and descriptions thereof will be omitted.

As illustrated in FIG. 19, the gate drive circuit 701 includes an output circuit 261, drive control circuits 662 to 664, and a drive control circuit 765. The drive control circuit 765 includes a transistor T78. The transistor T78 includes thin film transistors T78*a* and T78*b* connected in series. A gate electrode of the thin film transistor T78*a* is connected to a gate electrode of the thin film transistor T78*b*. The thin film transistors T78*a* and T78*b* are connected in series, and a source electrode of the thin film transistor T78*a* is connected to a drain electrode of the thin film transistor T78*b*. Thus, a drain electrode of the thin film transistor T78*a* functions as a drain electrode of the transistors T78, and a source electrode of the thin film transistor T78*b* functions as a source electrode of the transistors T78. The function of the transistor T78 is the same as that of the transistor T8 according to the second embodiment.

According to the seventh embodiment, the stress voltage applied to each of the thin film transistors constituting the transistor T78 can be reduced. Other configurations and effects according to the seventh embodiment are the same as the configurations and effects according to the second embodiment or the sixth embodiment.

Eighth Embodiment

Figure 20:
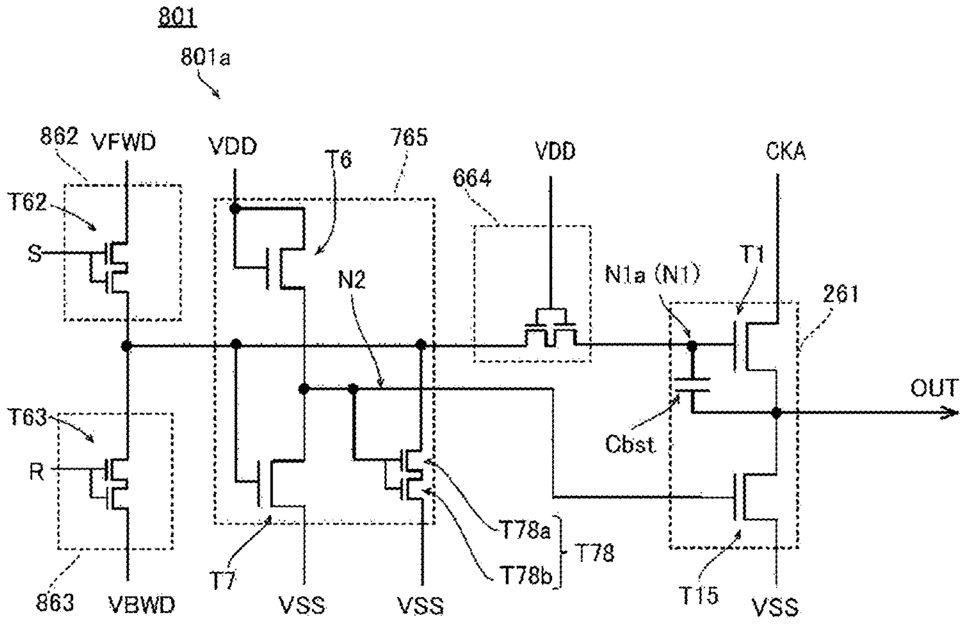
FIG. 20 is a circuit diagram illustrating a configuration of a gate drive circuit 801 according to an eighth embodiment.

Next, a configuration of a gate drive circuit 801 according to an eighth embodiment will be described with reference to FIG. 20. The eighth embodiment is a combination of the configuration of the seventh embodiment and the configuration of the third embodiment (bidirectional scanning). FIG. 20 is a circuit diagram illustrating the configuration of the gate drive circuit 801 according to the eighth embodiment. Note that the same configurations as those of any one of the first to seventh embodiments will be denoted by the same reference signs as those of any one of the first to seventh embodiments, and descriptions thereof will be omitted.

As illustrated in FIG. 20, the gate drive circuit 801 includes drive control circuits 862 and 863. The drive control circuit 862 includes a transistor T62. The drive control circuit 863 includes a transistor T63. A VFWD signal is input to the drive control circuit 862. A VBWD signal is input to the drive control circuit 863. Thus, according to the eighth embodiment, while enabling bidirectional scanning, the effects the same as the seventh embodiment can be achieved.

Ninth Embodiment

Next, a configuration of a display device 900 according to a ninth embodiment will be described with reference to FIGS. 21 to 23. In the ninth embodiment, a clear signal supplied at least at one of the points in time immediately after the power supply is turned on or immediately before the power supply is turned off is supplied to a unit circuit 901*a*. Note that the same configurations as those of any one of the first to eighth embodiments will be denoted by the same reference signs as those of any one of the first to eighth embodiments, and descriptions thereof will be omitted.

Figure 21:
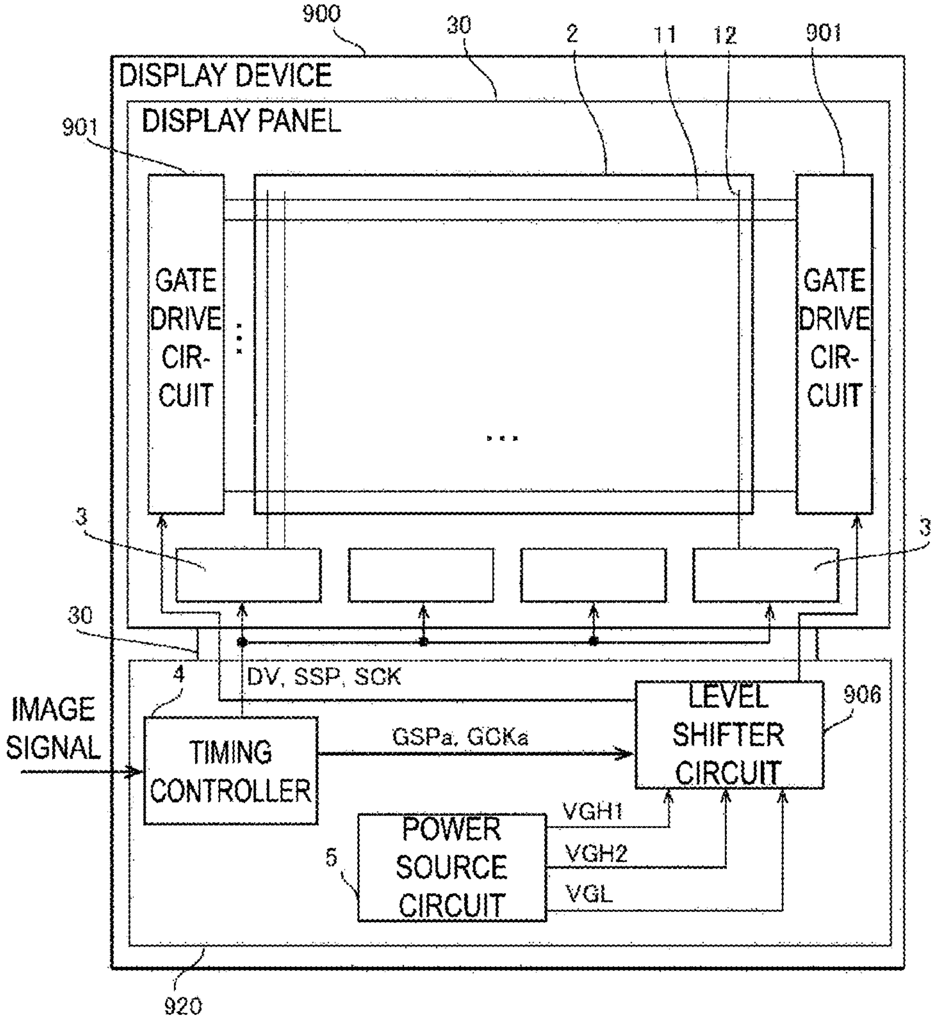
FIG. 21 is a block diagram illustrating a configuration of a display device 900 according to a ninth embodiment.

FIG. 21 is a block diagram illustrating the configuration of the display device 900 according to the ninth embodiment. FIG. 22 is a diagram illustrating a configuration of a gate drive circuit 901 according to the ninth embodiment. FIG. 23 is a circuit diagram illustrating a configuration of the unit circuit 901*a* according to the ninth embodiment. As illustrated in FIG. 21, the display device 900 includes the gate drive circuit 901 and a control board 920. The control board 920 is provided with a level shifter circuit 906. The level shifter circuit 906 transmits a CLR signal to the gate drive circuit 901 before the power supply to the display device 900 is turned on and driving (scanning) of the gate drive circuit 901 is started. In addition, when the power supply to the display device 900 is turned off, the level shifter circuit 906 transmits the CLR signal to the gate drive circuit 901 after the driving (scanning) of the gate drive circuit 901 is finished and before the power supply is turned off.

Figure 22:
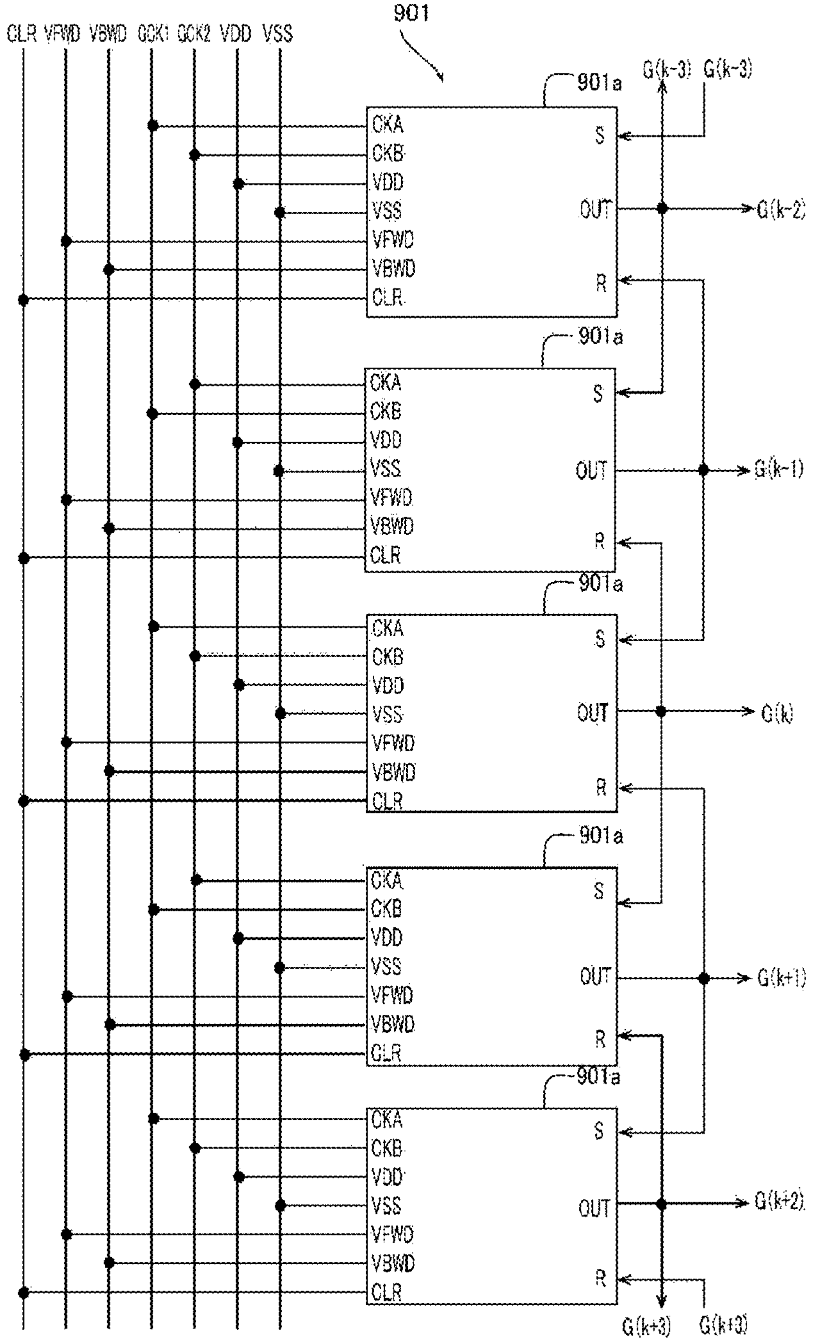
FIG. 22 is a diagram illustrating a configuration of a gate drive circuit 901 according to the ninth embodiment.

As illustrated in FIG. 22, the gate drive circuit 901 includes a plurality of unit circuits 901*a*. The CLR signal is input to each of the plurality of unit circuits 901*a*.

Figure 23:
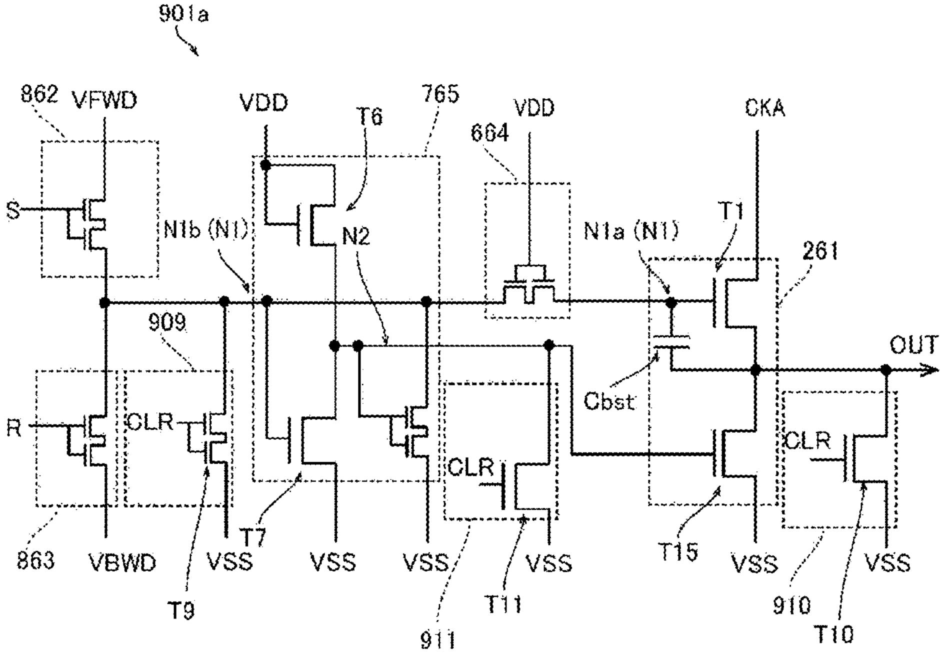
FIG. 23 is a circuit diagram illustrating a configuration of a unit circuit 901*a* according to the ninth embodiment.

As illustrated in FIG. 23, the unit circuit 901*a* includes initialization control circuits 909 to 911 in addition to the configuration of the unit circuit 801*a* according to the eighth embodiment.

The initialization control circuit 909 includes a transistor T9. The transistor T9 includes two thin film transistors connected in series, and the CLR signal is input to a gate electrode of the transistor T9. A source electrode of the transistor T9 is connected to a terminal to which a VSS signal is supplied. A drain electrode of the transistor T9 is connected to a second portion N1*b* of a node N1.

The initialization control circuit 910 includes a transistor T10. The CLR signal is input to a gate electrode of the transistor T10. A source electrode of the transistor T10 is connected to a terminal to which the VSS signal is supplied. A drain electrode of the transistor T10 is connected to a terminal OUT.

The initialization control circuit 911 includes a transistor T11. The CLR signal is input to a gate electrode of a transistor T11. A source electrode of the transistor T11 is connected to a terminal to which the VSS signal is supplied. A drain electrode of the transistor T11 is connected to a node N2.

According to the ninth embodiment, electric charge can be removed from the node N1, the node N2, and the terminal OUT at least at one of the points in time immediately after the power supply is turned on or immediately before the power supply is turned off. An unexpected operation caused by the electric charge existing in the node N1, the node N2, and the terminal OUT immediately after the power supply is turned on can be prevented. In a case in which the display device 900 is configured as an electronic paper display, control is executed in the order of page (image) rewriting, power supply off, power supply on, and page rewriting. Therefore, according to the ninth embodiment, a voltage caused by the electric charge is applied to each transistor in the unit circuit 901*a* after the power supply is turned off can be prevented.

MODIFIED EXAMPLES

Although embodiments of the disclosure have been described above, the embodiments described above are merely examples for implementing the disclosure. Thus, the disclosure is not limited to the embodiments described above, and can be implemented by appropriately modifying the embodiments described above within a range that does not depart from the gist of the disclosure. Now, modified examples of the above-described embodiments will be described.

(1) In the first to ninth embodiments described above, examples in which the display device is configured as an electrophoretic display device has been described, but the disclosure is not limited thereto. For example, the display device may be configured as a liquid crystal display device, an organic EL display device, a micro-LED display device, or the like.

(2) Although the examples in which the two gate drive circuits are provided in the display device are described in the first to ninth embodiments described above, the disclosure is not limited thereto. For example, only one gate drive circuit may be provided in the display device, or three or more gate drive circuits may be provided.

(3) In the first to ninth embodiments described above, the examples are described in which the clock signals are provided in two phases of CKA and CKB, but the disclosure is not limited thereto. The clock signal may be provided in two phases (a single phase or three or more phases).

(4) Although numerical examples of the voltage and the coupling ratio are described in the first to ninth embodiments described above, the disclosure is not limited to the numerical examples described above.

(5) Although the examples in which the transistor includes an In—Ga—Zn—O-based oxide semiconductor having crystallinity are described in the first to ninth embodiments described above, the disclosure is not limited thereto. The transistor may include an amorphous In—Ga—Zn—O-based oxide semiconductor, may include an oxide semiconductor other than In—Ga—Zn—O-based, or may include silicon.

(6) Although the examples in which the bootstrap capacitor Cbst is provided in the unit circuit are described in the first to ninth embodiments described above, the disclosure is not limited thereto. In a case in which the bootstrap operation can be performed by the capacitance of the transistor T1, the bootstrap capacitor is not necessarily provided in the unit circuit.

The above-described configuration can also be described as follows.

A drive circuit according to a first configuration is a drive circuit including a plurality of stages and configured to supply a drive signal to a group of scanning signal lines in response to a plurality of clock signals input thereto. The drive circuit includes a unit circuit constituting one stage of the plurality of stages and configured to output the drive signal to any one scanning signal line of the group of scanning signal lines. The unit circuit includes a first node, a first transistor configured to output the drive signal to the scanning signal line of the group of scanning signal lines, the first transistor including a gate electrode connected to the first node and a source electrode to which a first clock signal having a first voltage is applied, a second transistor to which a set signal for the unit circuit is input, the second transistor including a gate electrode to which the set signal is input, a source electrode to which a DC second voltage is applied, and a drain electrode connected to the first node, and a third transistor to which a reset signal for the unit circuit is input, the third transistor including a gate electrode to which the reset signal is input, a source electrode to which a DC third voltage is applied, and a drain electrode connected to the first node. A difference value between the second voltage and the third voltage is smaller than an amplitude of the first voltage (first configuration).

Here, the amplitude of the first voltage is A1, the difference value between the second voltage and the third voltage is Vd1, the threshold voltage of the second transistor is Vth2, and a multiplier based on the capacitance between the first node and a drain electrode of the first transistor is x. During a period when the drive circuit is driving, a voltage applied between the source electrode and the drain electrode of the second transistor (referred to as "stress voltage Vds") and the stress voltage Vds applied to the third transistor are expressed by the following Equation (1a). Note that, Vth2 is a value smaller than Vd1 and A1.

$$Vds = Vd1 - Vth2 + \alpha \times A1 \quad (1a)$$

A voltage Vgs applied to the gate electrode of the first transistor is expressed by the following Equation (2a).

$$Vgs = Vd1 - Vth2 + (\alpha - 1) \times A1 \quad (2a)$$

Since A1 is normally a value equal to Vd1, in this case, the stress voltage Vds is (1+α)×A1−Vth2. In addition, the voltage Vgs is α×Vd1−Vth2. For example, when A1=80 V, α=0.9, and Vth2=2 V, then Vds becomes 150 V. In addition, Vgs becomes 70 V. In a case in which the level of the drive signal output from the drive circuit is increased in this manner, there is a problem in that the high stress voltage is applied to the transistor and the transistor deterioration is accelerated. In contrast, according to the above first configuration, since the difference value (Vd1) between the second voltage and the third voltage is smaller than the amplitude (A1) of the first voltage, the stress voltage applied to the second transistor and the stress voltage applied to the third transistor can be reduced. Further, the voltage applied to the gate electrode of the first transistor can be reduced. As a result, even in a case in which the level of the drive signal output from the drive circuit is increased in this manner, the rate at which the first transistor, the second transistor, and the third transistor deteriorate can be reduced.

In the first configuration, the first node may include a first portion connected to the first transistor, and a second portion connected to the second transistor and the third transistor. The unit circuit may further include a fourth transistor connected between the first portion and the second portion, the fourth transistor including a gate electrode to which a DC fourth voltage is applied, a source electrode connected to the second portion, and a drain electrode connected to the first portion. A difference value between the fourth voltage and the third voltage may be configured to be smaller than the amplitude of the first voltage (second configuration).

According to the second configuration described above, the first node can be separated into the first portion and the second portion by the fourth transistor. As a result, the stress voltage Vds applied to the second transistor and the stress voltage Vds applied to the third transistor are expressed by the following Equation (3a).

$$Vds = Vd1 \quad (3a)$$

As a result, the stress voltage Vds applied to the second transistor and the stress voltage Vds applied to the third transistor can be further reduced.

In the first or second configuration, the second transistor may be configured such that the second voltage is applied to the source electrode of the second transistor in a case in which the drive circuit performs sequential scanning from a first stage to a final stage of the plurality of stages, and the third voltage is applied to the source electrode of the second transistor in a case in which the drive circuit performs reverse sequential scanning from the final stage to the first stage. The third transistor may be configured such that the third voltage is applied to the source electrode of the third transistor in a case in which the drive circuit performs sequential scanning from the first stage to the final stage, and the second voltage is applied to the source electrode of the third transistor in a case in which the drive circuit performs reverse sequential scanning from the final stage to the first stage (third configuration).

According to the third configuration described above, even in a case in which the drive circuit is configured to be drivable so as to perform bidirectional scanning, the rate at which the first transistor, the second transistor, and the third transistor deteriorate can be reduced.

In any one of the first to third configurations, the drive circuit may further include a fifth transistor connected to the drain electrode of the first transistor, the fifth transistor including a gate electrode to which a second clock signal having a phase different from that of the first clock signal is applied and a source electrode to which a DC fifth voltage is applied. A difference value between the second voltage and the fifth voltage may be configured to be smaller than the amplitude of the first voltage (fourth configuration).

According to the fourth configuration described above, even in a case in which the fifth transistor for pull-down is provided in the drive circuit, the rate at which the fifth transistor deteriorates can be reduced.

In any one of the first to third configurations, the drive circuit may include a second node, a fifth transistor connected to the drain electrode of the first transistor, the fifth transistor including a gate electrode connected to the second node and a source electrode to which a DC fifth voltage is applied, a sixth transistor including a source electrode to which a DC sixth voltage is applied, a gate electrode to which the DC sixth voltage is applied, and a drain electrode connected to the second node, a seventh transistor including a gate electrode connected to the first node, a source electrode connected to the second node, and a drain electrode to which a seventh voltage lower than the sixth voltage is applied, and an eighth transistor including a gate electrode connected to the second node, a source electrode connected to the first node, and a drain electrode to which the seventh voltage is applied. The gate electrode of the fifth transistor may be connected to the second node. The difference value between the second voltage and the fifth voltage may be configured to be smaller than the amplitude of the first voltage, and a difference value between the sixth voltage and the seventh voltage may be configured to be smaller than the amplitude of the first voltage (fifth configuration).

Here, in a case in which the first node is in a floating state, the potential of the first node may fluctuate due to noise of the first clock signal or other signals, and noise may be generated in the drive signal output from the drive circuit in some cases. In contrast, according to the fifth configuration, the first node entering into a floating state can be prevented, and therefore the potential fluctuation of the first node due to noise of the first clock signal or other signals can be prevented. As a result, noise generation in the drive signal output from the drive circuit can be prevented.

In any one of the first to fifth configurations, at least one of the second transistor and the third transistor may include two thin film transistors connected in series (sixth configuration).

According to the sixth configuration described above, since at least one of the second transistor and the third transistor includes two thin film transistors, the stress voltage applied to each of the two thin film transistors can be reduced.

In any one of the second, third, and sixth configurations, the fourth transistor may include two thin film transistors connected in series (seventh configuration).

According to the seventh configuration described above, since the fourth transistor includes two thin film transistors, the stress voltage applied to each of the two thin film transistors can be reduced.

In any one of the fifth to seventh configurations, the eighth transistor may include two thin film transistors connected in series (eighth configuration).

According to the eighth configuration described above, since the eighth transistor includes two thin film transistors, the stress voltage applied to each of the two thin film transistors can be reduced.

In any one of the first to eighth configurations, the drive circuit may further include a ninth transistor connected to the first node, the ninth transistor including a gate electrode to which a clear signal supplied at least at one of the points in time immediately after the power supply is turned on or immediately before the power supply is turned off is input, a drain electrode connected to the first node, and a source electrode to which a DC eighth voltage is applied. A difference value between the second voltage and the eighth voltage may be configured to be smaller than the amplitude of the first voltage (ninth configuration).

According to the ninth configuration described above, electric charge can be removed from the first node at least at one of the points in time immediately after the power supply is turned on or immediately before the power supply is turned off. In a case in which the electric charge is removed from the first node immediately after the power supply is turned on, occurrence of an unexpected operation caused by the electric charge can be prevented. In addition, in a case in which the electric charge is removed from the first node immediately before the power supply is turned off, a voltage caused by the electric charge being applied to the first transistor, the second transistor, and the third transistor after the power supply is turned off can be prevented.

In any one of the fourth to ninth configurations, the drive circuit may further include a tenth transistor connected to the fifth transistor, the tenth transistor including a gate electrode to which a clear signal supplied at least at one of the points in time immediately after the power supply is turned on or immediately before the power supply is turned off is input, a drain electrode connected to a drain electrode of the fifth transistor, and a source electrode to which the fifth voltage is applied (tenth configuration).

According to the tenth configuration described above, in a case in which the electric charge is removed from the drain electrode of the fifth transistor immediately after the power supply is turned on, occurrence of an unexpected operation caused by the electric charge can be prevented. In addition, in a case in which the electric charge is removed from the drain electrode of the fifth transistor immediately before the power supply is turned off, a voltage caused by the electric charge being applied to the fifth transistor and the first transistor connected to the fifth transistor after the power supply is turned off can be prevented.

In any one of the fifth to tenth configurations, the drive circuit may further include an eleventh transistor connected to the second node, the eleventh transistor including a gate electrode to which a clear signal supplied at least at one of the points in time immediately after the power supply is turned on or immediately before the power supply is turned off is input, a drain electrode connected to the second node, and a source electrode to which the seventh voltage is applied (eleventh configuration).

According to the eleventh configuration described above, electric charge can be removed from the second node at least at one of the points in time immediately after the power supply is turned on or immediately before the power supply is turned off. In a case in which the electric charge is removed from the second node immediately after the power supply is turned on, occurrence of an unexpected operation caused by the electric charge can be prevented. In addition, in a case in which the electric charge is removed from the second node immediately before the power supply is turned off, a voltage caused by the electric charge being applied to the sixth transistor, the seventh transistor, and the eighth transistor after the power supply is turned off can be prevented.

In any one of the first to eleventh configurations, at least one of the second transistor and the third transistor may include an oxide semiconductor (twelfth configuration). In the twelfth configuration, the oxide semiconductor may include an In—Ga—Zn—O-based oxide semiconductor (thirteenth configuration). In the thirteenth configuration, the In—Ga—Zn—O-based oxide semiconductor may include an In—Ga—Zn—O-based oxide semiconductor having crystallinity (fourteenth configuration).

According to any one of the twelfth to fourteenth configurations, power consumption can be reduced, driving speed can be increased, and high definition can be achieved as compared with a case in which the transistor is made of amorphous silicon.

A display device according to a fifteenth configuration includes the drive circuit described in any one of the first to fourteenth configurations, and a display arranged with the group of scanning signal lines (fifteenth configuration).

According to the fifteenth configuration described above, the display device that reduces the rate at which the first transistor, the second transistor, and the third transistor deteriorate can be provided, even in a case in which the level of the drive signal output from the drive circuit is increased in this manner.

An electrophoretic display device according to a sixteenth configuration includes the drive circuit according to any one of the first to fourteenth configurations, a pixel transistor connected to one scanning signal line of the group of scanning signal lines, a pixel electrode connected to the pixel transistor, a counter electrode arranged to face the pixel electrode, and charged particles arranged between the pixel electrode and the counter electrode (sixteenth configuration) .

Here, a higher voltage is applied to the transistor in the electrophoretic display device than in the liquid crystal display. According to the sixteenth configuration, since the voltage applied to the first transistor, the second transistor, and the third transistor can be reduced, the rate of transistor deterioration in the electrophoretic display device which is relatively susceptible to deterioration can be reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A drive circuit including a plurality of stages and configured to supply a drive signal to a group of scanning signal lines in response to input of a plurality of clock signals, the drive circuit comprising:

a unit circuit constituting one stage of the plurality of stages and configured to output the drive signal to any one scanning signal line of the group of scanning signal lines, wherein the unit circuit includes a first node, a first transistor configured to output the drive signal to a scanning signal line of the group of scanning signal lines, the first transistor including a gate electrode connected to the first node and a source electrode to which a first clock signal having a first voltage is applied, a second transistor to which a set signal for the unit circuit is input, the second transistor including a gate electrode to which the set signal is input, a source electrode to which a DC second voltage is applied, and a drain electrode connected to the first node, and a third transistor to which a reset signal for the unit circuit is input, the third transistor including a gate electrode to which the reset signal is input, a source electrode to which a DC third voltage is applied, and a drain electrode connected to the first node, and a difference value between the second voltage and the third voltage is smaller than an amplitude of the first voltage.

2. The drive circuit according to claim 1, wherein the first node includes a first portion connected to the first transistor and a second portion connected to the second transistor and the third transistor, the unit circuit further includes a fourth transistor connected between the first portion and the second portion, the fourth transistor including a gate electrode to which a DC fourth voltage is applied, a source electrode connected to the second portion, and a drain electrode connected to the first portion, and a difference value between the fourth voltage and the third voltage is smaller than the amplitude of the first voltage.

3. The drive circuit according to claim 2, wherein the fourth transistor includes two thin film transistors connected in series.

4. The drive circuit according to claim 1, wherein the second transistor is configured such that the second voltage is applied to the source electrode of the second transistor in a case in which the drive circuit performs sequential scanning from a first stage to a final stage of the plurality of stages, and the third voltage is applied to the source electrode of the second transistor in a case in which the drive circuit performs reverse sequential scanning from the final stage to the first stage, and the third transistor is configured such that the third voltage is applied to the source electrode of the third transistor in a case in which the drive circuit performs sequential scanning from the first stage to the final stage, and the second voltage is applied to the source electrode of the third transistor in a case in which the drive circuit performs reverse sequential scanning from the final stage to the first stage.

5. The drive circuit according to claim 1, further comprising:

a fifth transistor connected to a drain electrode of the first transistor, the fifth transistor including a gate electrode to which a second clock signal having a phase different from a phase of the first clock signal is applied and a source electrode to which a DC fifth voltage is applied, wherein a difference value between the second voltage and the fifth voltage is smaller than the amplitude of the first voltage.

6. The drive circuit according to claim 1, comprising:

a second node;

a fifth transistor connected to a drain electrode of the first transistor, the fifth transistor including a gate electrode connected to the second node and a source electrode to which a DC fifth voltage is applied;

a sixth transistor including a source electrode to which a DC sixth voltage is applied, a gate electrode to which the DC sixth voltage is applied, and a drain electrode connected to the second node;

a seventh transistor including a gate electrode connected to the first node, a source electrode connected to the second node, and a drain electrode to which a seventh voltage lower than the sixth voltage is applied; and an eighth transistor including a gate electrode connected to the second node, a source electrode connected to the first node, and a drain electrode to which the seventh voltage is applied, wherein a difference value between the second voltage and the fifth voltage is smaller than the amplitude of the first voltage, and a difference value between the sixth voltage and the seventh voltage is smaller than the amplitude of the first voltage.

7. The drive circuit according to claim 6, wherein the eighth transistor includes two thin film transistors connected in series.

8. The drive circuit according to claim 4, further comprising:

a tenth transistor connected to the fifth transistor, the tenth transistor including a gate electrode to which a clear signal supplied at least at one of the points in time immediately after the power supply is turned on or immediately before the power supply is turned off is input, a drain electrode connected to the drain electrode of the fifth transistor, and a source electrode to which the fifth voltage is applied.

9. The drive circuit according to claim 6, further comprising:

an eleventh transistor connected to the second node, the eleventh transistor including a gate electrode to which a clear signal supplied at least at one of the points in time immediately after the power supply is turned on or immediately before the power supply is turned off is input, a drain electrode connected to the second node, and a source electrode to which the seventh voltage is applied.

10. The drive circuit according to claim 1, wherein at least one of the second transistor and the third transistor includes two thin film transistors connected in series.

11. The drive circuit according to claim 1, further comprising:

a ninth transistor connected to the first node, the ninth transistor including a gate electrode to which a clear signal supplied at least at one of the points in time immediately after the power supply is turned on or immediately before the power supply is turned off is input, a drain electrode connected to the first node, and a source electrode to which a DC eighth voltage is applied, wherein a difference value between the second voltage and the eighth voltage is smaller than the amplitude of the first voltage.

12. The drive circuit according to claim 1, wherein at least one of the second transistor and the third transistor includes an oxide semiconductor.

13. The drive circuit according to claim 12, wherein the oxide semiconductor includes an In—Ga—Zn—O-based oxide semiconductor.

14. The drive circuit according to claim 13, wherein the In—Ga—Zn—O-based oxide semiconductor includes an In—Ga—Zn—O-based oxide semiconductor having crystallinity.

15. A display device, comprising:

the drive circuit according to claim 1; and a display arranged with the group of scanning signal lines.

16. An electrophoretic display device, comprising:

the drive circuit according to claim 1;

a pixel transistor connected to one scanning signal line of the group of scanning signal lines;

a pixel electrode connected to the pixel transistor;

a counter electrode arranged to face the pixel electrode; and charged particles arranged between the pixel electrode and the counter electrode.

* * * * *